US011965361B2

(12) United States Patent
Gopalakrishnan et al.

(10) Patent No.: US 11,965,361 B2
(45) Date of Patent: Apr. 23, 2024

(54) STATUS-INDICATING CYLINDRICAL LOCK ASSEMBLY

(71) Applicant: Schlage Lock Company LLC, Carmel, IN (US)

(72) Inventors: Subbiah Gopalakrishnan, Trivandrum (IN); Kevin E. David, Monument, CO (US); Kenton H. Barker, Colorado Springs, CO (US); Shell Bieker, Colorado Springs, CO (US); Daniel J. Compton, Colorado Springs, CO (US); Brandon Robinson, Colorado Springs, CO (US); Snehill Solanki, Colorado Springs, CO (US); Greg Hebner, Colorado Springs, CO (US); Bill Massey, Yoder, CO (US); Samir Tamer, San Jose, CA (US)

(73) Assignee: Schlage Lock Company LLC, Carmel, IN (US)

( * ) Notice: Subject to any disclaimer, the term of this patent is extended or adjusted under 35 U.S.C. 154(b) by 783 days.

(21) Appl. No.: 16/990,474

(22) Filed: Aug. 11, 2020

(65) Prior Publication Data

US 2020/0392760 A1 Dec. 17, 2020

Related U.S. Application Data

(63) Continuation of application No. 15/883,826, filed on Jan. 30, 2018, now Pat. No. 10,738,507, which is a (Continued)

(51) Int. Cl.
*E05B 41/00* (2006.01)
*E05B 15/00* (2006.01)
(Continued)

(52) U.S. Cl.
CPC ............ *E05B 55/005* (2013.01); *E05B 15/00* (2013.01); *E05B 27/0003* (2013.01); (Continued)

(58) Field of Classification Search
CPC .... E05C 1/16; Y10T 70/7486; E05B 27/0003; E05B 63/06; E05B 63/08; E05B 63/10; (Continued)

(56) References Cited

U.S. PATENT DOCUMENTS

| | | | |
|---|---|---|---|
| 1,944,469 | A | 1/1934 | Schlage |
| 2,793,522 | A | 5/1957 | Tornoe |

(Continued)

FOREIGN PATENT DOCUMENTS

| | | | |
|---|---|---|---|
| EP | 2284338 | A2 | 2/2011 |
| WO | 200713483 | A1 | 11/2007 |

OTHER PUBLICATIONS

Von Duprin, Classroom Security Indicator brochure, May 2013, one page, No. 009598, Ingersoll Rand, US.

(Continued)

*Primary Examiner* — Suzanne L Barrett
(74) *Attorney, Agent, or Firm* — Taft Stettinius & Hollister LLP

(57) ABSTRACT

An exemplary status-indicating locking assembly includes a cylindrical lock assembly and a status-indicating assembly. The status-indicating assembly includes a sensor configured to sense the status of the cylindrical lock assembly, a transmission configured to communicate the lock status to at least one side of a door, and an indicator configured to display indicia relating to the lock status on the at least one side of the door. In certain forms, the sensor, transmission, and indicator may be electronic, mechanical, hydraulic, magnetic, or combinations thereof.

17 Claims, 12 Drawing Sheets

Related U.S. Application Data continuation of application No. 14/702,962, filed on May 4, 2015, now Pat. No. 9,879,445.

(60) Provisional application No. 61/987,970, filed on May 2, 2014.

(51) Int. Cl.

*E05B 27/00* (2006.01)
*E05B 55/00* (2006.01)
*E05B 63/06* (2006.01)
*E05C 1/16* (2006.01)

(52) U.S. Cl.

CPC .............. *E05B 41/00* (2013.01); *E05B 63/06* (2013.01); *E05C 1/16* (2013.01); *Y10T 70/7486* (2015.04)

(58) Field of Classification Search

CPC . E05B 15/00; E05B 9/00; E05B 17/10; E05B 27/0092; E05B 41/00; E05B 55/005; E05B 2047/0067
USPC ........................................................... 70/432
See application file for complete search history.

(56) References Cited

U.S. PATENT DOCUMENTS

| | | | |
|---|---|---|---|
| 3,304,756 A | | 2/1967 | Eads |
| 3,881,331 A | | 5/1975 | Tranberg et al. |
| 4,490,999 A | | 1/1985 | Castle et al. |
| 4,559,796 A | | 12/1985 | De Forrest, Sr. |
| 4,683,741 A | | 8/1987 | Fields |
| 4,760,380 A | | 7/1988 | Quenneville et al. |
| 5,933,086 A | | 8/1999 | Tischendorf et al. |
| 5,945,648 A | * | 8/1999 | M'Sadoques ........ H01H 71/501 200/43.14 |
| 6,189,351 B1 | | 2/2001 | Eagan et al. |
| 6,225,903 B1 | | 5/2001 | Soloway et al. |
| 6,351,977 B1 | | 3/2002 | Pedroso et al. |
| 6,441,735 B1 | | 8/2002 | Marko et al. |
| 6,584,818 B2 | | 7/2003 | Bates et al. |
| 6,622,537 B2 | | 9/2003 | Rodriguez |
| 6,860,129 B2 | | 3/2005 | Eller et al. |
| 6,938,445 B2 | | 9/2005 | Huang |
| 7,248,163 B2 | | 7/2007 | Wu |
| 7,388,467 B2 | | 6/2008 | Fisher et al. |
| 7,714,739 B2 | | 5/2010 | Schensky |
| 7,866,195 B2 | | 1/2011 | Levine |
| 8,037,725 B2 | | 10/2011 | Levine |
| 9,169,669 B2 | | 10/2015 | Clary et al. |
| 9,879,445 B2 | | 1/2018 | Gopalakrishnan et al. |
| 10,738,507 B2 | * | 8/2020 | Gopalakrishnan .......................... E05B 27/0003 |
| 2002/0095957 A1 | | 7/2002 | Bates et al. |
| 2003/0010075 A1 | | 1/2003 | Rodriguez |
| 2003/0160681 A1 | | 8/2003 | Menard et al. |
| 2006/0107713 A1 | | 5/2006 | Kugel |
| 2008/0289383 A1 | | 11/2008 | Levine |
| 2009/0273440 A1 | | 11/2009 | Marschalek et al. |
| 2013/0067969 A1 | | 3/2013 | Webb et al. |
| 2013/0081434 A1 | | 4/2013 | Grant et al. |
| 2014/0311197 A1 | | 10/2014 | Abel et al. |
| 2015/0225982 A1 | | 8/2015 | Bronner |
| 2016/0145898 A1 | | 5/2016 | Ohl et al. |
| 2016/0353542 A1 | | 12/2016 | Orr |
| 2018/0155959 A1 | | 6/2018 | Hartung et al. |

OTHER PUBLICATIONS

Schlage, Classroom Security Indicators brochure, Jun. 2013, one page, No. 009574, Ingersoll Rand, US.
Corbin Russwin, Classroom Security Solutions for Cylindrical and Mortise Locks flyer, Jan. 2013, two pages, No. 45313, Corbin Russwin Architectural Hardware, US.
Yale, Classroom Security Solutions for Cylindrical and Mortise Locks flyer, Feb. 2013, two pages, No. 42851, Yale Locks & Hardware, a division of Yale Security Inc., US.
Best, Securing A World Where They Are Free To Learn flyer, Apr. 2008, two pages, No. B-222, Best Access Systems, US.
Sargent, Classroom Security Solutions for Bored and Mortise Locks brochure, Jan. 2013, two pages, No. 90771, Sargent Manufacturing Company, US.
Indicator Locks Bathroom & Bedroom Privacy Commercial & Residential Use Reversible for Left & Right Door Opening Large Occupancy Inscription "IN-USE" or "VACANT", www.indicatorlock.com, 2 pages.
International Search Report; International Searching Authority; US Patent and Trademark Office; International PCT Application No. PCT/US2015/029035, dated Sep. 8, 2015; 2 pages.
Written Opinion of the International Searching Authority; International Searching Authority; US Patent and Trademark Office; International PCT Application No. PCT/US2015/029035, dated Sep. 8, 2015; 7 pages.
Canadian Office Action; Canadian Intellectual Property Office; Canadian Patent Application No. 2,947,755, dated Aug. 30, 2017; 3 pages.

* cited by examiner

STATUS-INDICATING CYLINDRICAL LOCK ASSEMBLY

CROSS-REFERENCE TO RELATED APPLICATIONS

The present application is a continuation of U.S. patent application Ser. No. 15/883,826 filed Jan. 30, 2018 and issued as U.S. Pat. No. 10,738,507, which is a continuation of U.S. patent application Ser. No. 14/702,962, filed May 4, 2015 and issued as U.S. Pat. No. 9,879,445, which claims the benefit of U.S. Provisional Patent Application No. 61/987,970, filed May 2, 2014, the contents of each application incorporated herein by reference in their entirety.

TECHNICAL FIELD

The present invention generally relates to status indicators for cylindrical lock assemblies, and more particularly, but not exclusively, to status indicators for classroom-type cylindrical lock assemblies.

BACKGROUND

In certain settings, it is often desirable to provide a locking assembly with a lock cylinder on each side, such that an authorized person can lock and unlock the assembly from either side of the door. Such double-cylinder assemblies are often configured as a mortise lock assembly or a cylindrical lock assembly. Locking assemblies of this type may be selectively operable from an outer side of the door, while remaining continuously operable from an inner side of the door. In this manner, the locking assembly can prevent an intruder from entering a room, while allowing for emergency egress from inside the room.

It is also often desirable that the locking assembly provide a visual indication of the status of the assembly, in order to enable a user to quickly determine whether the door is locked or unlocked. While mortise assemblies include various features which facilitate the use of status indicators, the unique construction of cylindrical lock assemblies has presented obstacles to providing a status indicator for such assemblies. For example, mortise assemblies allow for a direct connection between the deadbolt turn piece and the status indicator. In contrast, the mechanisms which provide the locking functionality in a cylindrical lock assembly are often isolated from the visible portions of the assembly by a variety of elements, such as spring cages, mounting plates, and roses. These elements obstruct the path between the location at which the status of the locking assembly can be sensed and the location at which the status indicator would be mounted.

For these reasons among others, while certain conventional mortise assemblies include visual status indicators, current cylindrical lock assemblies do not. Instead, current double-cylinder cylindrical lock assemblies often include an arrow and the word "lock" (e.g. on the inner lock cylinder, inner lock handle, and/or inner lock rose) to indicate which way the key must be rotated to lock the assembly. In order to determine the status of the assembly, the user must approach the door, insert the key, and attempt to rotate the key in the locking direction. This is not only inconvenient, but can also put the user in danger, for example in an emergency situation where an armed intruder may be just outside the door. There is a need for the unique and inventive status indicator apparatuses, systems and methods disclosed herein.

SUMMARY

An exemplary status-indicating locking assembly includes a cylindrical lock assembly and a status-indicating assembly. The status-indicating assembly includes a sensor configured to sense the status of the cylindrical lock assembly, a transmission configured to communicate the lock status to at least one side of a door, and an indicator configured to display indicia relating to the lock status on the at least one side of the door. In certain forms, the sensor, transmission, and indicator may be electronic, mechanical, hydraulic, magnetic, or combinations thereof. Further embodiments, forms, features, aspects, benefits, and advantages of the present application shall become apparent from the description and figures provided herewith.

DETAILED DESCRIPTION OF ILLUSTRATIVE EMBODIMENTS

Figure 1:
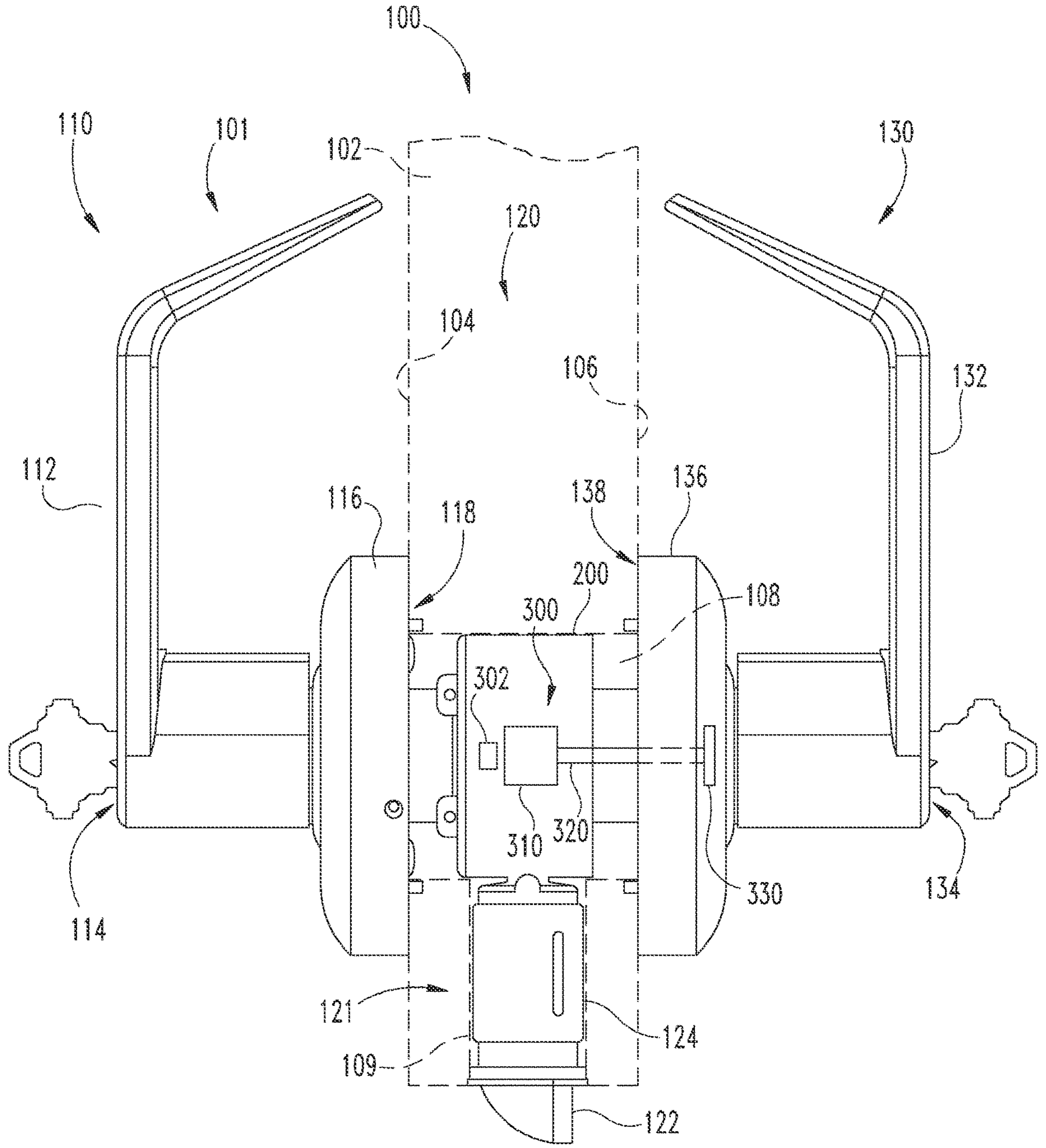
FIG. 1 is a schematic illustration of a cylindrical lock assembly including a status-indicating assembly according to a form of the invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 2:
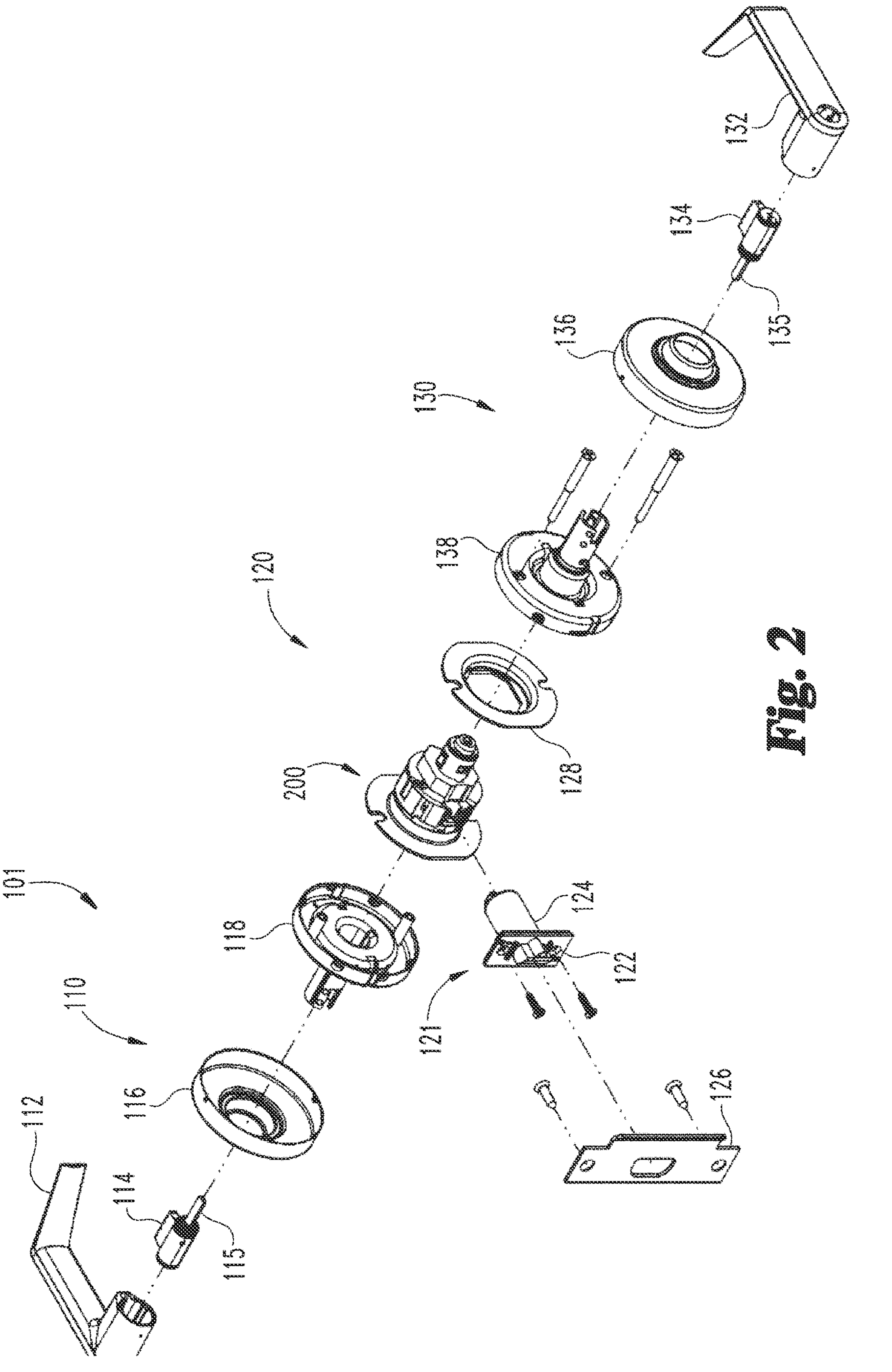
FIG. 2 depicts an exploded view of an exemplary cylindrical lock assembly.
Figure 3:
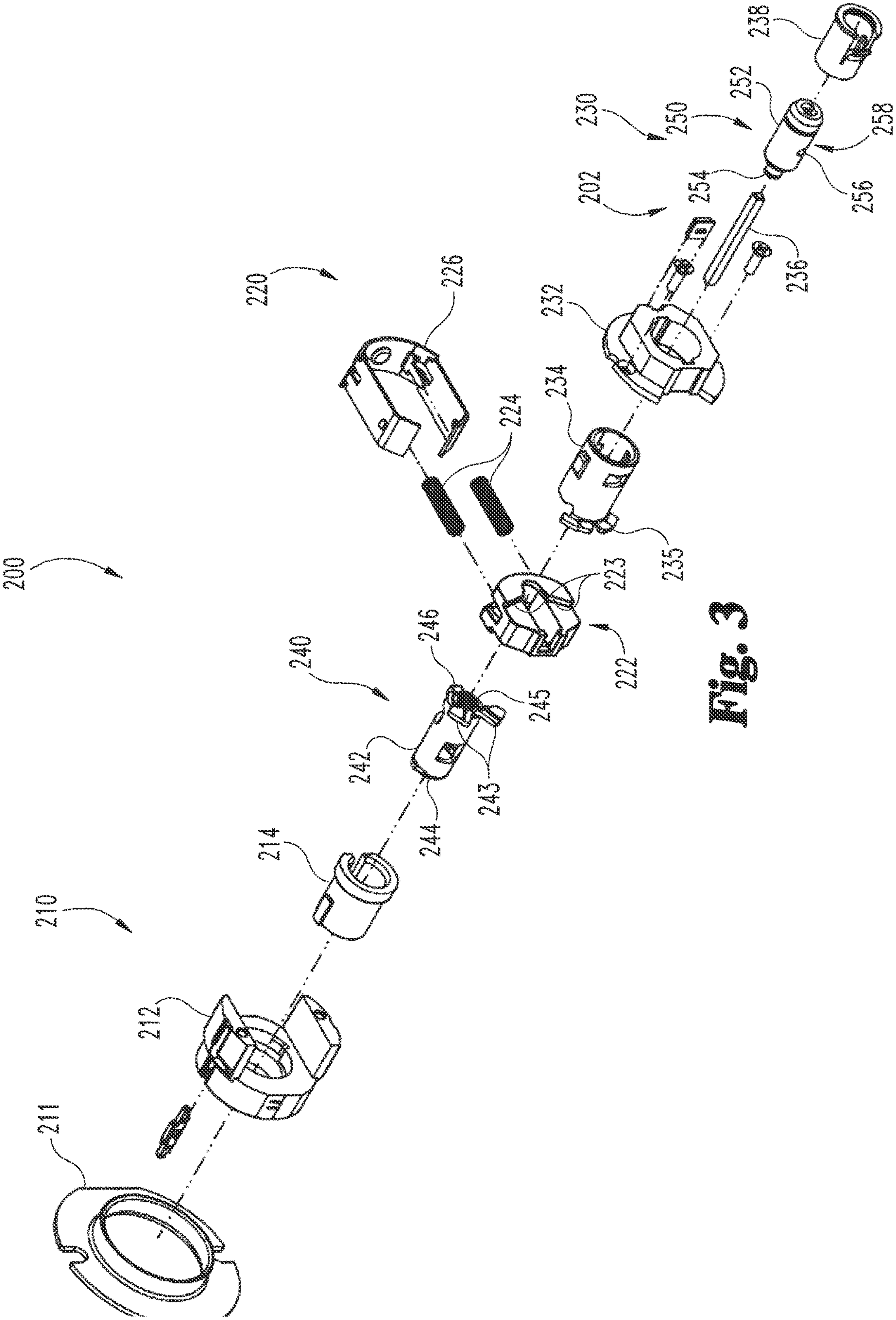
FIG. 3 depicts an exploded view of a chassis of the exemplary cylindrical lock assembly.
Figure 4:
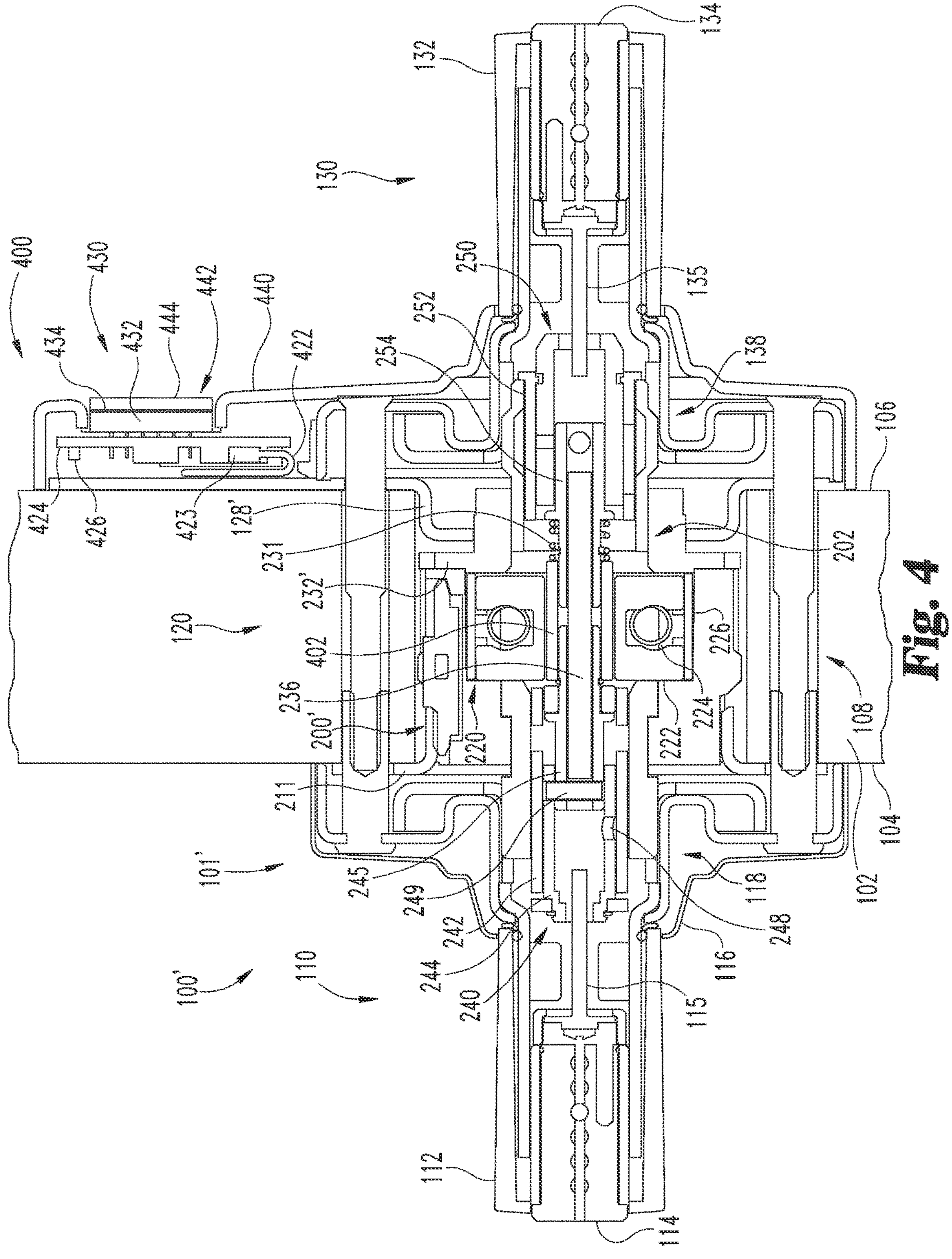
FIG. 4 is an illustration of a vertical cross-section of a cylindrical lock assembly including an electronic status-indicating assembly according to a form of the invention.
Figure 5:
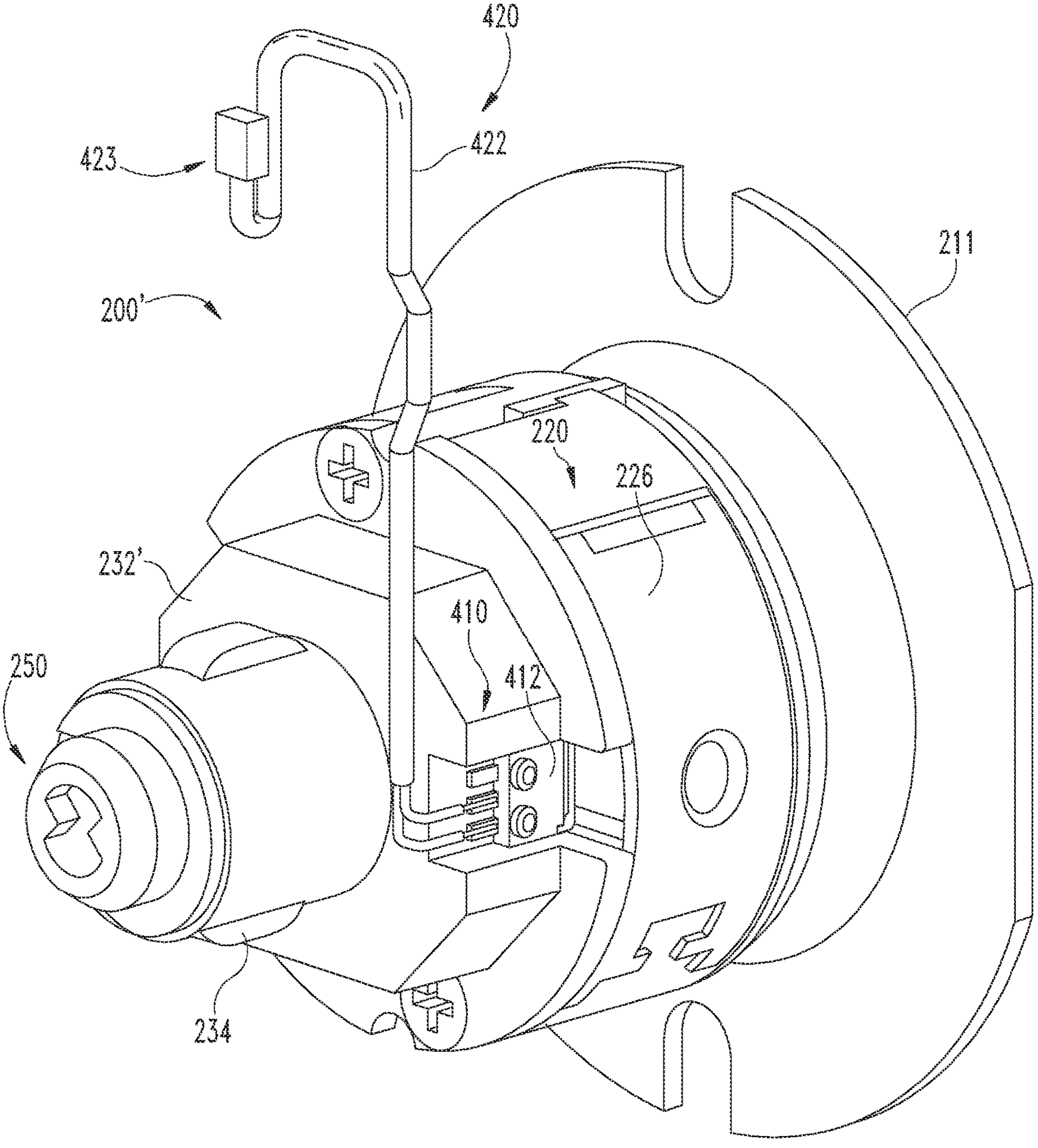
FIG. 5 is an isometric illustration of a chassis and a portion of the electronic status-indicating assembly.
Figure 6:
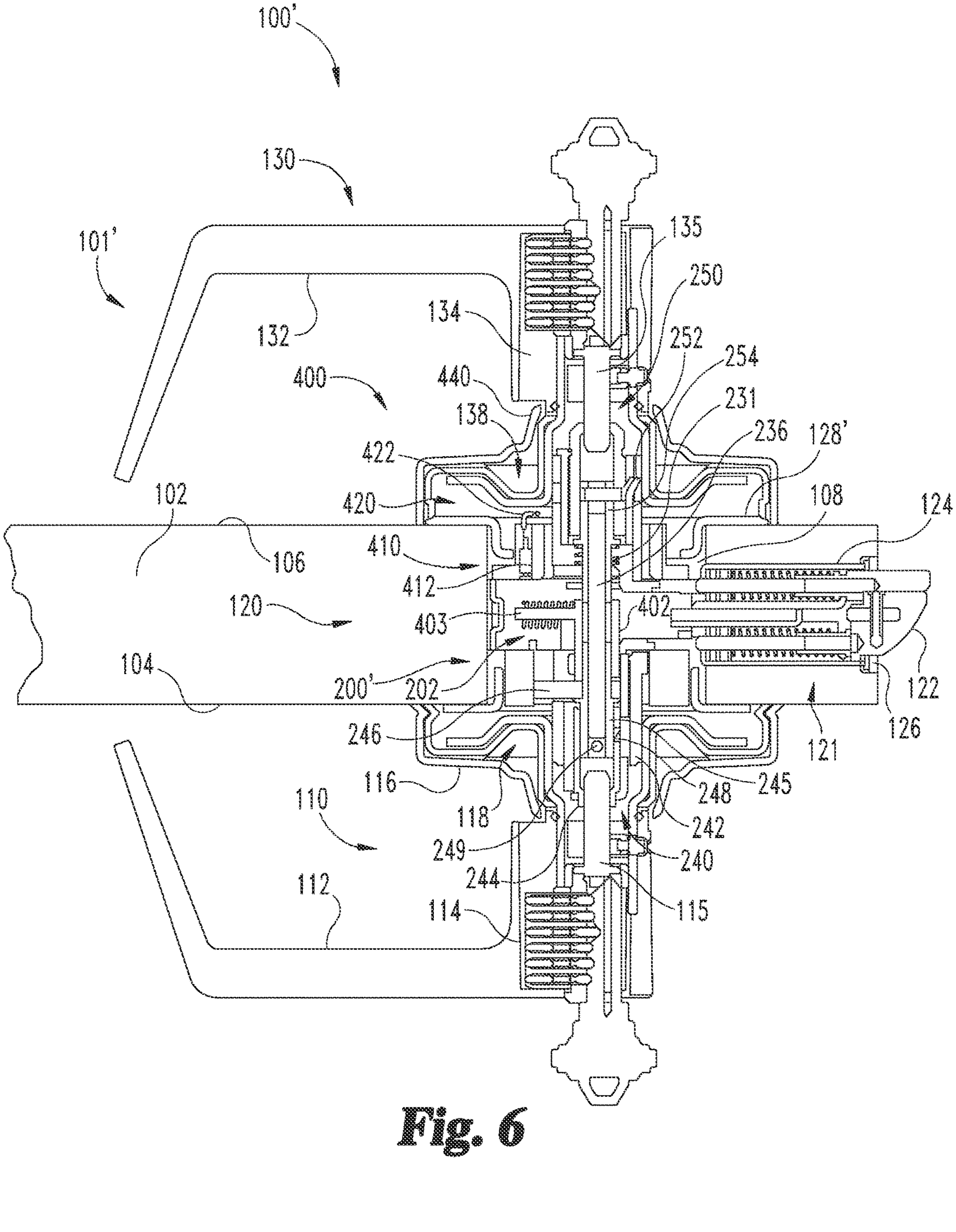
FIG. 6 is an illustration of a horizontal cross-section of the locking assembly depicted in FIG. 4 in an unlocked state.
Figure 7:
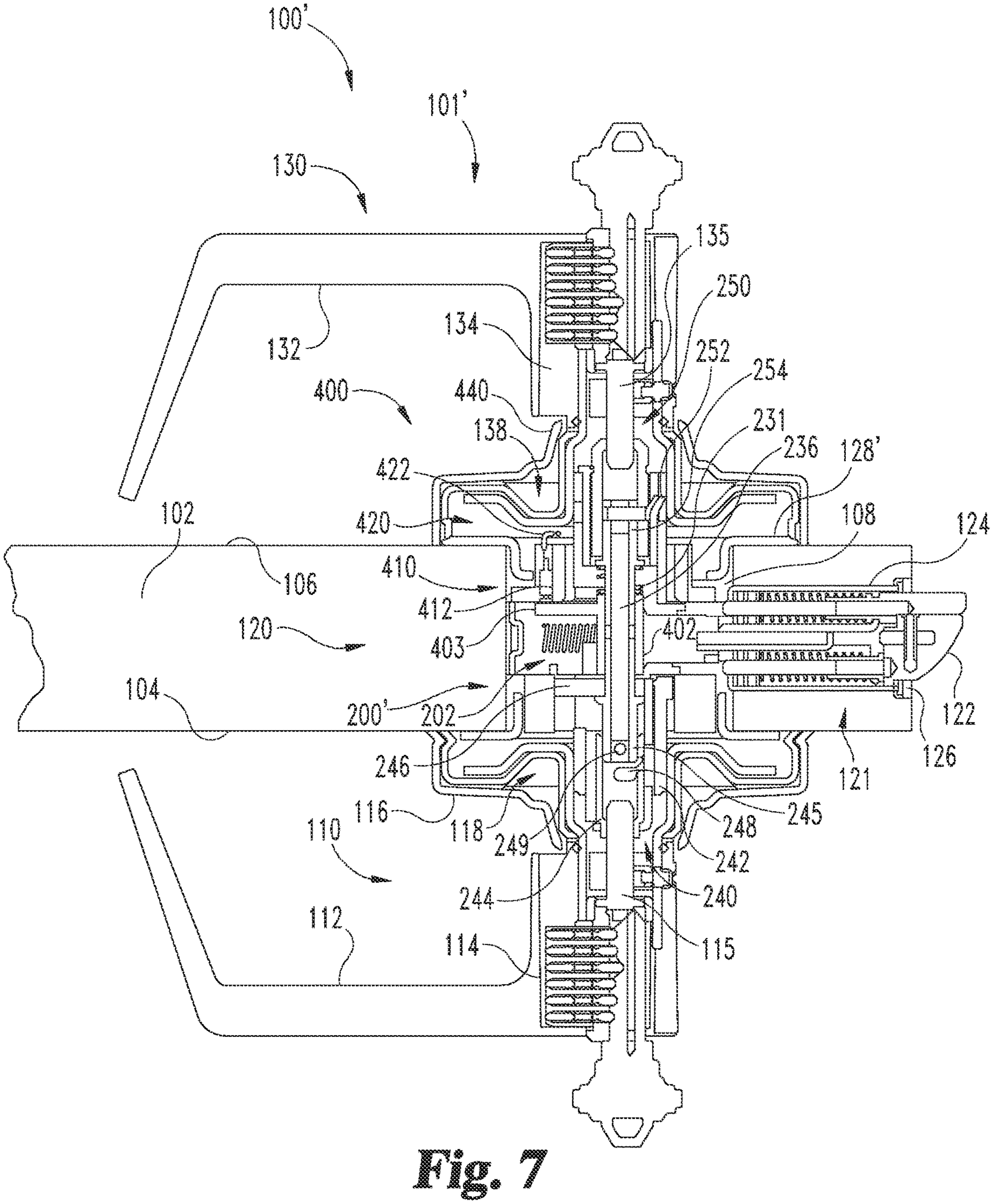
FIG. 7 is an illustration of a horizontal cross-section of the locking assembly depicted in FIG. 4 in a locked state.

With reference to FIGS. 1-3, an exemplary status-indicating locking assembly 100 comprises a cylindrical lock assembly 101 and a status-indicating assembly 300 according to an embodiment of the invention. The cylindrical lock assembly 101 includes an outer assembly 110, a center assembly 120 including a chassis 200, and an inner assembly 130. The locking assembly 100 may be installed on a door 102, for example to control access to a room or other space.

The door 102 includes an unsecured or outer side 104, a secured or inner side 106, a cross-bore 108, and an edge bore 109. When installed on the door 102, the outer assembly 110 is mounted on the door outer side 104, the center assembly 120 is positioned at least partially within the cross-bore 108, and the inner assembly 130 is mounted on the door inner side 106. As described in further detail below, the novel features of the status-indicating assembly 300 enable the status-indicating locking assembly 100 to be installed on the door 102 without requiring modification of the door 102. As such, the door 102 may be a commercially available door, and the cross-bore 108 and edge bore 109 may be of standard dimensions.

In certain embodiments, the status-indicating locking assembly 100 may include a commercially available form of cylindrical lock assembly 101. In such embodiments, the locking assembly 100 may be created by retrofitting the existing cylindrical lock assembly 101 with the status-indicating assembly 300. In other embodiments, the locking assembly 100 may be manufactured as a unit including both the cylindrical lock assembly 101 and the status-indicating assembly 300. Furthermore, while a single exemplary form of the cylindrical lock assembly 101 is described herein, it is to be appreciated that the status indicating assembly 300 may be utilized with a number of cylindrical lock assemblies having a variety of configurations.

As best seen in FIG. 1, the outer assembly 110 includes an outer actuator or handle 112, an outer lock cylinder 114 positioned in the handle 112, an outer rose 116, and an outer spring cage 118 positioned in the rose 116. When installed, the handle 112 engages the spring cage 118, and the rose 116 abuts the door 102 to prevent tampering with the internal components. The lock cylinder 114 includes an outer tailpiece 115, and is configured to selectively permit rotation of the tailpiece 115, for example upon insertion of a proper key. The spring cage 118 is configured to bias the handle 112 to a home position; in the illustrated embodiment, the handle 112 is substantially horizontal in the home position, although other forms are contemplated.

The center assembly 120 extends through the cross-bore 108, and connects the outer assembly 110 to the inner assembly 130. The center assembly 120 comprises a latch bolt assembly 121 including a latch bolt 122 and a housing 124, a strike 126 including an opening configured to receive a portion of the latch bolt 122, a mounting plate 128, and a chassis 200 which selectively couples the outer handle 112 to the latch bolt 122. During installation, the chassis 200 is inserted into the cross-bore 108 from the door outer side 104, and the mounting plate 128 is attached to the chassis 200 from the door inner side 106. The latch bolt assembly 121 is inserted into the edge bore 109, and connected to a portion of the chassis 200. The strike 126 is mounted to the door frame to receive the latch bolt 122 when the door 102 is closed.

The inner assembly 130 is substantially similar to the outer assembly 110, and includes an inner actuator or handle 132, an inner lock cylinder 134 including a tailpiece 135, an inner rose 136, and an inner spring cage 138, each of which is substantially similar to the respective elements described above with respect to the outer assembly 110. As will be described in further detail below, while the outer handle 112 is selectively operable to retract the latch bolt 122, the inner handle 132 may be continuously operable to retract the latch bolt 122.

While the illustrated status-indicating locking assembly 100 includes exemplary features as described above, it is also contemplated that additional or alternative features may be included. For example, while the illustrated handles 112, 132 are of the lever type, it is also contemplated that one or more of the handles 112, 132 may comprise a different type of actuator, such as a knob. In embodiments which include knobs instead of levers, one or more of the spring cages 118, 138 may be omitted. Additionally, while the exemplary lock cylinders 114, 134 are of the key-in-lever variety, it is also contemplated that that one or more of the cylinders 114, 134 may be of another format, such as small format interchangeable core (SFIC). Additionally, in certain forms, the cylinders 114, 134 may each be operable by an identical set of key cuts. In other forms, the outer cylinder 114 may be operable by a first set of key cuts, and the inner cylinder 134 may be operable by a second set of key cuts, which may include the first set of key cuts. Furthermore, while the illustrated outer and inner assemblies 110, 130 are substantially similar, it is also contemplated that one may include features or elements which are not present in the other. For example, in certain forms, the inner assembly 130 may not necessarily include the inner lock cylinder 134.

As best seen in FIG. 3, the illustrative chassis 200 includes an outer chassis assembly 210, a slide assembly 220, and an inner chassis assembly 230. The chassis 200 is configured to selectively couple the outer handle 112 to the latch bolt assembly 121, and may further be configured to continuously couple the inner handle 132 to the latch bolt assembly 121. As described in further detail below, the outer chassis assembly 210 includes a first drive tube in the form of an outer key cam shell 242, and the inner chassis assembly 230 includes a second drive tube in the form of an inner spindle 234. The slide assembly 220 is positioned between the drive tubes 234, 242, and is configured to move transversely in response to each of rotation of the inner spindle 234 and rotation of the outer key cam shell 242.

Figure 12:
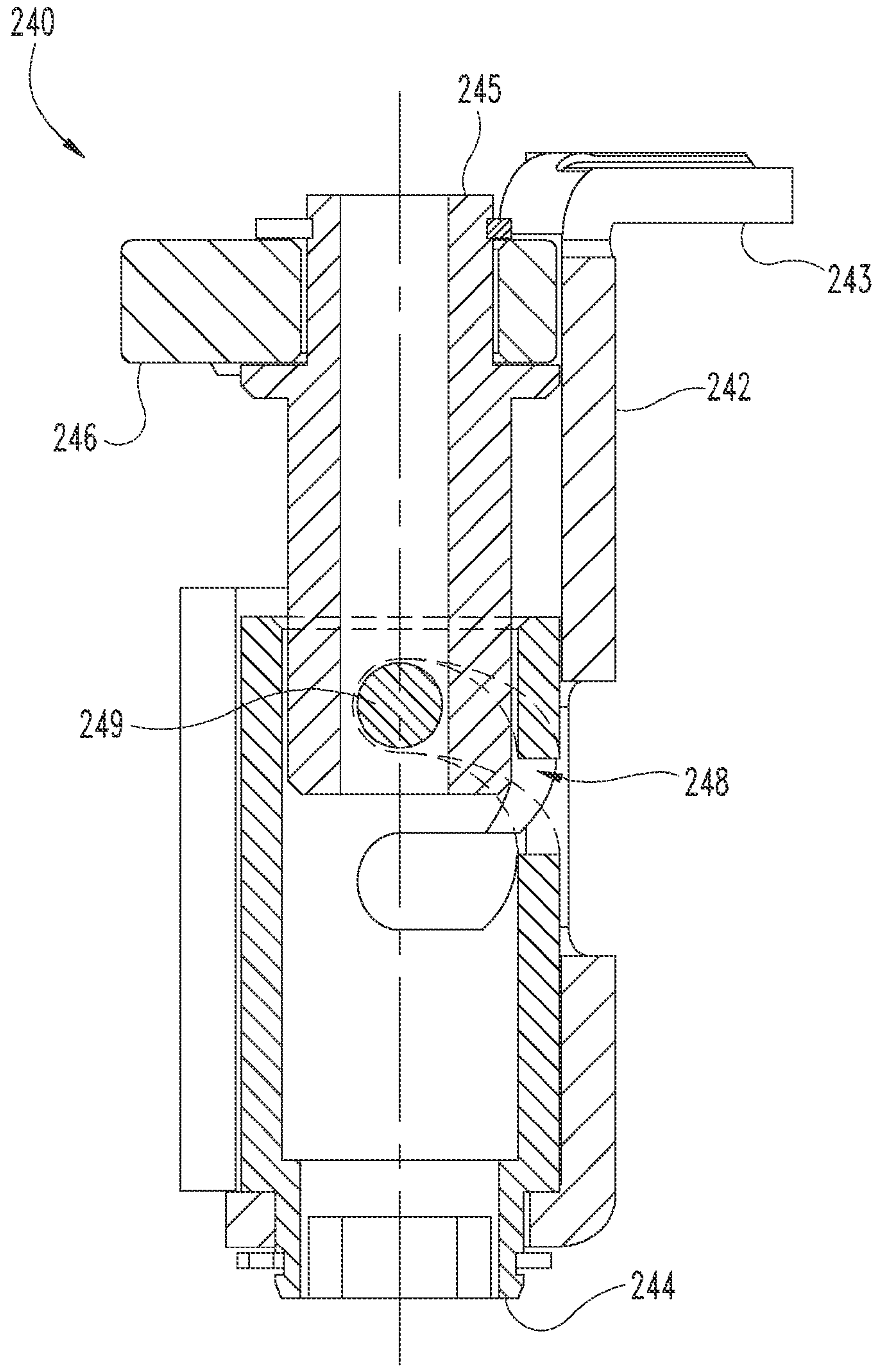
FIG. 12 depicts an illustrative form of key cam which may be used in a cylindrical lock assembly.

The outer chassis assembly 210 includes an adjustment plate 211, a housing 212, an outer spindle 214, and an outer key cam 240. The outer spindle 214 is seated in the housing 212, and is operably coupled with the outer assembly 110 such that rotation of the outer handle 112 causes the spindle 214 to rotate. With additional reference to FIG. 12, the outer key cam 240 includes an outer key cam shell 242 including radial arms 243, an outer key cam plug 244 which is rotatable with respect to the shell 242, a stem 245, and a clutching lug 246 protruding from the stem 245. The plug 244 includes a helical channel 248, and the stem 245 includes a rivet or pin 249 projecting into the channel 248. The key cam 240 is connected to the outer tailpiece 115 such that rotation of the tailpiece 115 causes rotation of the plug 244. As the plug 244 rotates, the pin 249 travels along the helical channel 248, causing the stem 245 and lug 246 to move axially. As described in further detail below, the clutching lug 246 is axially and rotationally movable between an unclutched, locking position and a clutched, unlocking position to selectively couple the outer handle 112 to the slide assembly 220. In another form, the key cam 240 may be of the type disclosed in the commonly-owned U.S. Pat. No. 6,189,351 to Eagan et al., the contents of which are hereby incorporated by reference. The connection between the tailpiece 115 and the key cam 240 may include a lost motion connection such as a "bowtie" opening, such that the tailpiece 115 must rotate a predetermined amount before causing the plug 244 to rotate.

The slide assembly 220 includes a slide 222 including cam surfaces 223, and biasing members or springs 224 which are retained in the slide 222 by a clip 226. The cam surfaces 223 are engageable by the arms 243, such that rotation of the outer key cam shell 242 causes transverse motion of the slide 222. The slide assembly 220 is operably coupled to the latch bolt assembly 121, such that transverse motion of the slide 222 causes the latch bolt 122 to extend or retract. The slide assembly 220 may, for example, also be of the type disclosed in the patent to Eagan et al.

The inner chassis assembly 230 includes a hub 232, an inner spindle 234 seated in the hub 232, a drive bar 236, a sleeve 238, and an inner key cam 250. Like the outer key cam shell 242, the inner spindle 234 includes arms 235 which, when the spindle 234 is rotated, engage one of the cam surfaces 223 to move the slide 222 and retract the latch bolt 122. The inner spindle 234 is rotationally coupled to the inner handle 132, such that the inner handle 132 is operable to retract the latch bolt 122.

The inner key cam 250 operably connects the inner tailpiece 135 to the drive bar 236, and includes an inner key cam shell 252, an inner key cam stem 254 that is rotatable with respect to the shell 252 and rotationally coupled with the drive bar 236, and a post 256 extending from the stem 254 into a radial channel 258 formed in the shell 252. Rotation of the tailpiece 135 through a predetermined angle causes rotation of the inner key cam stem 254, which in turn rotates the drive bar 236. The outer key cam stem 245 is slidingly and rotationally coupled to the drive bar 236, such that the stem 245 is free to travel axially along the drive bar 236 as the stem 245 moves between the clutched and unclutched positions.

The outer key cam stem 245, the drive bar 236, and the inner key cam stem 254 are rotationally coupled to form a lock control assembly 202. That is to say, rotation of any element of the lock control assembly 202 causes a corresponding rotation of each other element of the lock control assembly 202. Accordingly, when the clutching lug 246 is in the unclutched, locking position or the clutched, unlocking position, each element of the lock control assembly 202 is in a corresponding locking or unlocking position, and the lock control assembly 202 is in a corresponding locking or unlocking state. In this manner, each of the lock cylinders 114, 134 is operable to set the lock control assembly 202 to the locking or unlocking state.

When the lock control assembly 202 is in the unlocking state, the clutching lug 246 is in the clutched position, and the outer handle 112 is operably coupled to the slide assembly 220. In this state, rotation of the outer handle 112 rotates the outer key cam shell 242. As the shell 242 rotates, one of the arms 243 engages one of the cam surfaces 223, causing transverse motion of the slide 222 and retraction of the latch bolt 122. Thus, when the lock control assembly 202 is in the unlocking state, the locking assembly 100 is in an unlocked state, and the outer handle 112 is operable to retract the latch bolt 122.

When the lock control assembly 202 is in the locking state, the clutching lug 246 is in the unclutched position, and the outer handle 112 is not operably coupled to the slide assembly 220. In this state, rotation of the outer handle 112 does not rotate the outer key cam shell 242, and the outer handle 112 is free to rotate without retracting the latch bolt 122. Thus, when the lock control assembly 202 is in the locking state, the locking assembly 100 is in a locked state, and the outer handle 112 is not operable to retract the latch bolt 122. In the illustrated form, the assembly 100 is of the type occasionally referred to as "free-wheeling", and the handle 112 is free to rotate when the assembly 100 is locked. It is also contemplated that the assembly 100 may be of the "locked-stationary" configuration, wherein the outer handle 112 is prevented from rotating when the lock control assembly 202 is in the locking state.

In the illustrated embodiment, the inner handle 132 remains operably coupled to the slide assembly 220 in both the unlocked and locked states of the locking assembly 100. That is to say, the inner handle 132 is operable to retract the latch bolt 122, regardless of the state of the lock control assembly 202. As such, a user inside the room can open the door 102 for emergency egress, even when the locking assembly 100 is locked.

As noted above, the outer key cam stem 245 including the clutching lug 246, the drive bar 236, and the inner key cam stem 254 including the post 256 are rotationally coupled in the lock control assembly 202. The locked or unlocked state of the locking assembly 100 can therefore be determined by sensing the position of any element of the lock control assembly 202.

As previously noted, various features of cylindrical lock assemblies such as the illustrated assembly 101 present obstacles which have hindered the creation of a viable status indicator for such assemblies. For example, it is desirable that the chassis 200 be mountable in a standard cross-bore 108 without requiring additional drilling or other modification of the door 102. Additionally, the spring cages 118, 138 abut the door 102, effectively sealing the cross-bore 108 from the visible portions of the locking assembly 100. That is to say, the spring cages 118, 138 obstruct the path between the location where the status of the locking assembly 100 can be sensed and the roses 116, 136, where the lock status is typically displayed.

As best seen in FIG. 1, the status-indicating assembly 300 is associated with a movable element 302 of the cylindrical lock assembly 101, and includes a sensor 310, a transmission 320 coupled to the sensor 310, and an indicator 330 coupled to the transmission 320. The movable element 302 may be any element from which the state or status of the locking assembly 100 may be determined based upon the position of the movable element 302. By way of non-limiting example, the movable element 302 may be an element of the lock control assembly 202, or may be another feature. As described above, each element of the lock control assembly 202 is operable in a locking position when the locking assembly 100 is locked, and an unlocking position when the locking assembly 100 is unlocked.

As described in further detail below, during operation of the status-indicating assembly 300, the sensor 310 senses the status of the locking assembly 100, the transmission 320 communicates the status to the indicator 330, and the indicator 330 displays an indicia relating to the status of the locking assembly 100. The various elements of the status-indicating assembly 300 may perform their respective functions utilizing any of a number of different operating principles. For example, one or more of the sensor 310, the transmission 320, and the indicator 330 may utilize electronic, mechanical, hydraulic, or magnetic operating principles, or a combination thereof.

The sensor 310 is configured to sense the status of the locking assembly 100 by sensing at least one position of the movable element 302 from which status of the locking assembly 100 can be determined. The sensor 310 is associated with the movable element 302, and is operable in a lock-indicating state when the movable element 302 is in the locking position, and an unlock-indicating state when the movable element 302 is in the unlocking position. The sensor 310 may be directly associated with the movable element 302, or may be associated with the movable element 302 through one or more intermediate elements.

The transmission 320 is configured to communicate the status of the locking assembly 100 from the sensor 310 to the indicator 330. The transmission 320 may be directly associated with the sensor 310 and/or the indicator 330, or may be connected to one or more of the sensor 310 and the indicator 330 through one or more intermediate elements. The transmission 320 may further be configured to control the indicator 330 such that the indicator 330 displays the indicia corresponding to the state of the sensor 310.

The indicator 330 is mounted on the cylindrical lock assembly 101 such that at least a portion of the indicator 330 is visible from at least one side of the door 102. In the illustrated embodiment, the indicator 330 is mounted on the door inner side 106, such that the indicator 330 is visible from inside the room when the door 102 is closed. It is also contemplated that the indicator 330 may be mounted on the door outer side 104, such that the indicator 330 is visible from outside the room when the door 102 is closed. For example, when the locking assembly 100 is installed primarily for security purposes, the indicator 330 may be mounted on the door inner side 106. When the locking assembly 100 is installed primarily for privacy purposes (such as in a restroom or changing room), the indicator 330 may be mounted on the door outer side 104 to indicate whether the room is occupied or vacant.

Furthermore, while the illustrated indicator 330 is visible through an opening in the inner rose 136; it is also contemplated that the indicator 330 may be mounted on the inner rose 136, and that the indicator 330 may be positioned elsewhere, such as on or in the outer rose 116 or one of the handles 112, 132. Additionally, while the exemplary form of status-indicating assembly 300 includes a single indicator 330, it is also contemplated that a plurality of indicators 330 may be employed, and that two of the indicators may be visible from the same or opposing sides of the door 102.

The exemplary indicator 330 is configured to display a first, "locked" indicia when the locking assembly 100 is in the locked state, and to display a second, "unlocked" indicia when the locking assembly 100 is in the unlocked state. One or more of the indicia may include, for example, a color, an icon, a word, or another form of indicia which a user can readily interpret to determine the status of the locking assembly 100. The indicator 330 may further be configured to display one or more of the indicia such that the indicia is visible from at least a predetermined distance throughout a predetermined viewing angle. For example, the indicator 330 may display the indicia such that the indicia is visible from a distance of at least 20 feet across a 180° viewing angle.

In certain forms of the status-indicating assembly 300, the sensor 310, transmission 320, and indicator 330 may all utilize the same operating principle. For example, the status-indicating assembly 300 may be entirely or primarily electronic, mechanical, hydraulic, or magnetic. Illustrative forms of status-indicating assemblies 300 which entirely or primarily utilize a single operating principle will now be described.

In certain embodiments, the status-indicating assembly 300 may be a mechanical status-indicating assembly including a mechanical sensor 310, transmission 320, and indicator 330. Mechanical forms of the sensor 310 may be configured to move in response to motion of the movable element 302. Such mechanical sensors 310 may include, for example, a gear, a cam, or a plunger, and may be adapted for rotary motion, linear motion, or a combination thereof. For example, if the sensor 310 includes a plunger, the unlock-indicating state may be a first linear position of the plunger, and the lock-indicating state may be a second linear position of the plunger.

Exemplary mechanical forms of the transmission 320 may include one or more of a mechanical linkage, a sleeved cable, a gear train, a belt, a chain, and a sprocket. Such a mechanical transmission 320 may be configured to transmit the motion of the mechanical sensor 310 to the indicator 330. For example, if the sensor 310 includes a gear, the transmission 320 may include a gear train which rotates in response to rotation of the sensor gear.

A mechanical form of the indicator 330 may include, for example, an indicator plate that moves pivotally, rotationally, and/or linearly behind a window through which a portion of the indicator plate is visible. The indicator plate may have a first section including the first indicia and a second section including the second indicia, and may be movable between a first position wherein substantially only the first section is visible through the window, and a second position wherein substantially only the second section is visible through the window. In certain forms, the indicia may be visible from at least 20 feet in a 180 degree arc from the indicator 330. A mechanical indicator may also include a photoluminescent element, such that the indicia glow in the dark. A mechanical status-indicating assembly 300 may also include a mechanical amplifying mechanism, such as a lever or a cam, to increase the movement of the indicator plate.

In other embodiments, the status-indicating assembly 300 may be an electronic status-indicating assembly including an electronic sensor 310, transmission 320, and indicator 330. In such embodiments, the sensor 310 may include an electronic switch or sensor, such as a microswitch, a vane sensor, an optical sensor, a photo-sensor, or a magnet in combination with a reed switch or Hall effect sensor. The electronic sensor 310 may be actuated by linear or rotational movement of the movable element 302 as the movable element 302 moves between the locked and unlocked positions. By way of non-limiting example, if the sensor 310 is a reed sensor, the movable element 302 may have a magnet mounted thereon. As the movable element 302 moves between the locked and unlocked positions, the reed switch transitions between the lock-indicating state and the unlock-indicating state as a result of the changing magnetic field. One of the lock-indicating and unlock-indicating states may be a circuit-closing state wherein electricity is conducted through the transmission 320 to the indicator 330, and the other may be a circuit-breaking state wherein electricity is not conducted through the transmission 320.

An electronic form of the transmission 320 may, for example, include wires or fiber-optic cables. Such electronic forms of the transmission 320 may further include a controller or electrical circuit configured to control the indicator 330 based upon the state of the sensor 310. Such circuits may be powered by batteries, line power, or solar cells. An energy harvesting mechanism may be installed in the locking assembly 100 or the door 102, and may convert mechanical energy—for example from acceleration, motion, or vibration of the locking assembly 100, the door 102, or a component thereof—into electrical energy. The electrical energy supplied by the energy-harvesting mechanism may be stored in an energy storage device such as a rechargeable battery or a capacitor such as a super-capacitor.

Electronic forms of the indicator 330 may include a primarily electronic display, such as one or more light emitting diodes (LEDs), a liquid crystal display (LCD), an electronic paper display (EPD), or an incandescent, fluorescent, or electroluminescent display. The indicator 330 may further include a controller or electrical circuit configured to control operation of the indicator 330 based upon information received from the transmission 320.

By way of illustration, the indicator 330 may include an LED or another light-producing element configured to display the first and second indicia in response to commands from a controller. One of the indicia may include the on state of the LED, and the other of the indicia may include the off state of the LED. For example, the LED may periodically blink or flash when the locking assembly 100 is in the locked state, and remain off when the locking assembly 100 is in the unlocked state. The indicator 330 may further include a transparent or translucent window, which may have a lock icon stenciled or molded into it. In such a case, the lock icon may be visible when the LED is in the on state, and less visible or not visible when the LED is in the off state. The window may protrude from the element on which it is mounted, in order to increase the angle across which the indicia can be viewed. Such a protruding window may, for example, be dome-shaped.

In certain forms, the LED or other light producing element may be directly visible; for example, the LED may be mounted in an opening formed in one of the roses 116, 136. In other forms, the LED may be mounted on an internal component of the locking assembly 100, and a light pipe may be utilized to transmit the light from the LED to a visible location. For example, the LED may be mounted on a printed circuit board (PCB), and a fiber-optic cable may transmit the light to a visible location on one of the roses 116, 136. The light pipe may include a dome-shaped end protruding from the rose 116, 136, in order to increase the angle across which the indicia can be viewed.

While the above-described electronic forms of the sensor 310, transmission 320, and indicator 330 are primarily electronic, it is also contemplated that an electronic form of one or more of these elements may include an electromechanical device, such as an electric motor, an electromagnet, a solenoid, or a piezoelectric element. An illustrative form of status-indicating assembly 300 including an electromechanical device is described below.

In certain forms, the status-indicating assembly 300 may be a hydraulic status-indicating assembly including a hydraulic sensor 310, transmission 320, and indicator 330. A hydraulic form of the sensor 310 may comprise a hydraulic cylinder containing a hydraulic fluid such as a mineral oil, and a piston or other reciprocating member, such as a diaphragm. The hydraulic cylinder may be fluidly coupled to a hydraulic form of the transmission 320, which may, for example, comprise a hydraulic line.

The piston may be associated with the movable element 302 such that the piston moves between retracted and extended positions in response to motion of the movable element 302 between the locked and unlocked positions. In the retracted position of the piston, the hydraulic cylinder comprises a greater effective volume; in the extended position of the piston, the hydraulic cylinder comprises a lesser effective volume. As the piston moves from the retracted position to the extended position in response to a first motion of the movable element 302, at least a portion of the hydraulic fluid is ejected from the hydraulic cylinder (for example, into the hydraulic transmission 320). As the piston moves from the extended position to the retracted position in response to a second motion of the movable element 302, hydraulic fluid is drawn into the hydraulic cylinder (for example, from the hydraulic transmission 320). The piston and movable element 302 may be directly coupled, or may be indirectly coupled, for example through a gear, a cam, or a plunger.

A hydraulic form of the indicator 330 may be a primarily hydraulic indicator. Such a hydraulic indicator 330 may include, for example, a tube which contains a colored hydraulic fluid, and which is fluidly coupled to the hydraulic transmission 320. The tube may further contain a compressible fluid such as a gas, or the tube may be vacuum-sealed. The tube may include a first portion which is visible by a user and a second portion which is concealed from the user. When the piston is in the retracted position, the hydraulic fluid may be positioned primarily in the concealed portion, such that the color of the hydraulic fluid is not visible to the user. When the piston is in the extended position, the hydraulic fluid may be positioned at least partially in the visible portion, such that the color of the hydraulic fluid is visible to the user. Thus, one of the indicia may include the absence of the hydraulic fluid in the visible portion of the tube, and the other of the indicia may include the presence of the hydraulic fluid in the visible portion of the tube.

In other forms, the hydraulic indicator 330 may be a hydraulic-mechanical indicator. For example, a hydraulic-mechanical indicator 330 may include a slave hydraulic cylinder fluidly coupled with the hydraulic cylinder of the hydraulic sensor 310, which acts as a master hydraulic cylinder. When the master piston is in the retracted position, the slave piston is in an extended position, and when the master piston is in the extended position, the slave piston is in a retracted position. The slave piston may be coupled to a visual indicator plate similar to those described above, such that the one of the indicia is displayed in the retracted position of the slave piston, and the other of the indicia is displayed in the extended position of the slave piston.

In further embodiments, the status-indicating assembly 300 may be a magnetic status-indicating assembly including a magnetic sensor 310, transmission 320, and indicator 330. For example, a magnetic form of the sensor 310 may include a magnet on a cam or a plunger that moves in response to motion of the movable element 302. A magnetic form of the transmission 320 may include a mechanical linkage configured to move in response to motion of the magnet in the magnetic sensor 310. For example, the mechanical linkage may move when the magnet of the sensor 310 reaches a threshold proximity to a magnet coupled to the transmission 320 or a magnetic component of the transmission 320. A magnetic form of the indicator 330 may include a magnet coupled to an indicator plate similar to those described above with respect to the mechanical form of the status-indicating assembly 300. The transmission 320 may cause the indicator 330 to move linearly and/or rotationally to display the appropriate indicia, for example when a magnet coupled to the transmission 320 reaches a threshold proximity to a magnet coupled to the indicator 330.

While the above-described forms of the status-indicating assembly 300 entirely or primarily utilize a single operating principle, in certain forms, the elements of the status-indicating assembly 300 may utilize varied operating principles. That is to say, additional embodiments of the invention may combine a sensor 310, transmission 320, and indicator 330 from the mechanical, electronic, hydraulic, and/or magnetic systems. For example, an electronic form of the sensor 310 may be coupled to electrical wires included in the transmission 320. The transmission 320 may further include an electrical circuit connected to a motor operable to move a mechanical form of the indicator 330 between the lock-indicating and unlock-indicating positions. In other forms, the status-indicating assembly 300 may include a mechanical form of the sensor 310 and a mechanical form of the transmission 320 connected to an electronic form of the indicator 330. The mechanical transmission 320 may actuate a switch when the sensor 310 is in the lock-indicating position. Actuation of the switch may close a circuit to provide electrical power to the electronic indicator 330, causing the indicator 330 to display the locked indicia.

As will be evident from the following descriptions of illustrative forms of the status-indicating assembly 300, certain forms of the assembly 300 can be installed to a conventional cylindrical lock assembly such as the illustrated lock assembly 101, and a commercially available door such as the illustrated door 102, without significant modification of the lock assembly 101 or the door 102. Modifications which may not be necessary include, for example, providing additional openings to the door 102, enlarging the cross-bore 108, and modifying the spring cages 118, 138. That is to say, the door 102, cross-bore 108, and spring cages 118, 138 may be of a type which is standard, unmodified, and commercially available. For example, the door 102 may comprise a standard thickness in the range of about one and five eighths inches to about two inches, and the cross-bore 108 may comprise a standard diameter, such as approximately two and one eighth inches.

Furthermore, the status-indicating assembly 300 may be a passive status-indicating assembly operable to display the appropriate indicia without being acted upon by a user. In such forms, the user can readily determine the status of the locking assembly 100 merely by looking at the indicator 330 without having to approach the door 102.

With reference to FIGS. 4-7, a status-indicating locking assembly 100' includes a modified cylindrical lock assembly 101' and an electronic status-indicating assembly 400 according to an embodiment of the invention. The status-indicating locking assembly 100' is substantially similar to the previously-described locking assembly 100; unless indicated otherwise, the same reference characters are used to indicate the same elements, and similar reference characters are used to indicate similar elements. In the present form, the previously-described mounting plate 128 is replaced by a mounting plate 128', and the previously-described inner rose 136 is replaced by an inner escutcheon 440; further features regarding these elements are described below.

The locking assembly 100' includes a movable element in the form of a plunger 402 which is slidingly coupled to the drive bar 236. The plunger 402 is biased into contact with the outer key cam stem 245 by a spring 231, such that the axial position of the plunger 402 corresponds to that of the outer key cam stem 245. Due to the fact that the locked or unlocked state of the locking assembly 100' depends upon the axial position of the outer key cam stem 245, the status of the locking assembly 100' can be determined based upon the axial position of the plunger 402.

The electronic status-indicating assembly 400 includes an electronic sensor 410, an electronic transmission 420 coupled to the sensor 410, and an electronic indicator 430 coupled to the transmission 420. In the illustrated embodiment, the sensor 410 comprises an electric switch such as a microswitch 412, the transmission 420 comprises a wire harness 422 and a controller 424, and the indicator 430 comprises an electronic paper display (EPD) 432. It is also contemplated that one or more elements of the status-indicating assembly 400 may be of another form, such as those described above with respect to the status indicating assembly 300.

The sensor 410 is configured to sense the status of the locking assembly 100' based at least in part upon the axial position of the plunger 402, and is mounted on a modified chassis 200'. The chassis 200' includes a modified hub 232' including a cutout or opening configured to receive the microswitch 412. When installed, the microswitch 412 is aligned with an arm 403 radially extending from the plunger 402. When the locking assembly 100' is in the unlocked state (FIG. 6), the spring 231 biases the plunger 402 axially outward (toward the door outer side 104), such that the arm 403 does not contact the microswitch 412. In this state, the microswitch 412 is not actuated, defining the unlock-indicating state of the sensor 410.

As the locking assembly 100' transitions to the locked state, the outer key cam stem 245 urges the plunger 402 axially inward (toward the door inner side 106) against the biasing force of the spring 231. When the outer key cam stem 245 reaches the locking position (FIG. 7), the arm 403 contacts the sensor 410. This contact actuates the microswitch 412, defining the lock-indicating state of the sensor 410. In the illustrated embodiment, the lock-indicating and unlock-indicating states of the sensor 410 comprise actuated and unactuated states, respectively, of the microswitch 412. It is also contemplated that the lock-indicating state may comprise the unactuated state of the microswitch 412, and that the unlock-indicating state may comprise the actuated state of the microswitch 412.

In certain embodiments, the microswitch 412 may comprise a single pole, double throw (SPDT) switch. In such forms, the microswitch 412 may include three wires attached thereto, such that the sensor 410 may be connected to two separate circuits. For example, one of the circuits may be closed when the lock control assembly 202 is in the locked position, and the other circuit may be closed when the assembly 202 is in the unlocked position.

While the illustrated movable element is the axially movable plunger 402, it is also contemplated that the sensor 410 may be associated with another movable element from which the status of the locking assembly 100' can be determined. For example, a selected element of the lock control assembly 202—such as one of the key cam stems 245, 254 or the drive bar 236—may include an eccentric cam surface. The sensor 410 may be associated with the selected element, such that the cam surface actuates the microswitch 412 when the selected element is in one of the locking and unlocking positions, and does not actuate the microswitch 412 in the other of the locking and unlocking positions.

The transmission 420 is configured to communicate the status of the locking assembly 100' from the sensor 410 to the indicator 430, and comprises a wire harness 422 connected at one end to the microswitch 412. The other end of the wire harness 422 includes a connector 423 which, when the status indicating assembly 400 is assembled, is coupled to the controller 424. The wire harness 422 may extend from the microswitch 412 to the controller 424 via a channel (not illustrated) in the mounting plate 128', for example as described below with reference to FIG. 11.

The transmission 420 may further comprise an energy storage device such as a battery 426 to provide electrical power to the controller 424. In the illustrated form, the controller 424 comprises a printed circuit board (PCB) including an electrical circuit, and is configured to control the indicator 430 based at least in part upon the state of the sensor 410. For example, the controller 424 may issue a first command or signal to the indicator 430 in response to the lock-indicating state of the sensor 410, and may issue a second command or signal to the indicator 430 in response to the unlock-indicating state of the sensor 410. In certain forms, when the sensor 410 is in one of the lock-indicating and unlock-indicating states, the controller 424 may issue the corresponding signal continuously or intermittently. As described in further detail below, however, the illustrated controller 424 is configured to issue the signals in response to the sensor 410 transitioning between the lock-indicating and unlock-indicating states.

The exemplary indicator 430 comprises an electronic paper display (EPD) 432 mounted on the door inner side 106 behind the inner escutcheon 440. The inner escutcheon 440 includes an opening 442 through which at least a portion of the EPD 432 is visible from inside the room when the door 102 is closed. In the illustrated embodiment, the indicator 430 is mounted on the PCB of the controller 424, which is in turn mounted on the mounting plate 128'. The controller 424 and the indicator 430 may be releasably coupled to one another and/or to the mounting plate 128, such that when the inner escutcheon 440 is removed, the elements may be easily removed for maintenance or replacement. Furthermore, while the illustrated indicator 430 is visible from inside the room when the door 102 is closed, it is also contemplated that the indicator 430 may additionally or alternatively be visible from another location, such as outside the room when the door 102 is closed.

The indicator 430 is configured to display at least two distinct indicia in response to commands or signals received from the controller 424. One or more of these indicia may include, for example, text, an icon, a color, or another form of indicia which a user can readily identify as indicating the status of the locking assembly 100'. For instance, an unlocked indicia may include an icon of an unlocked padlock, the color green, or text such as "UNLOCKED" or "VACANT", while a locked indicia may include an icon of a locked padlock, the color red, or text such as "LOCKED", "OCCUPIED", or "DO NOT DISTURB". The controller 424 may include a computer readable medium including instructions which, when executed, cause the indicator 430 to display the locked indicia in response to the lock-indicating state of the sensor 410 and the unlocked indicia in response to the unlock-indicating state of the sensor 410.

In certain forms, the indicator 430 may be configured to provide indicia which are visible from an increased viewing angle, such as a 180° viewing angle. For example, the indicator 430 may include multiple EPDs which are visible from different angles. In other forms, the EPD 432 may include a convex viewing surface protruding from the inner escutcheon 440, such that the indicia is visible across the viewing angle.

In the illustrated form, the indicator 430 comprises an EPD 432 of the electrophoretic type, although it is also contemplated that other forms of EPD, such as electrowetting and electrofluidic displays, may be utilized. As is known in the art, electrophoretic EPDs include a plurality of pixels, each comprising a capsule containing electrically charged particles of a first color and a fluid of a second color. Such electrophoretic EPDs commonly utilize white, negatively charged titanium dioxide particles and an oily solution containing black ink, although other forms are contemplated. The capsules may be positioned between a base electrode on a concealed base side of the EPD 432, and a clear surface electrode on a visible surface 434 of the EPD 432.

When an electrical charge is applied to a pixel through the electrodes, the charged particles are urged toward the surface electrode or the base electrode, depending upon the polarities of the electrode charges and the particle charge. For example, if the polarity of the particle charge is the same as that of the base electrode charge, the particles are urged away from the base electrode, and toward the visible surface 434. In such a case, the particles are adjacent to the visible surface 434, and a user perceives the pixel to be the color of the particles. The pixel remains in this configuration until an opposite electrical charge is applied, at which point the particles are attracted to the base electrode. Once the particles migrate to the base electrode, the fluid is adjacent to the visible surface 434, and the user perceives the pixel to be the color of the fluid.

Due to the above-described features, the controller 424 need only issue commands or signals to the indicator 430 when the sensor 410 changes states. For example, when the sensor 410 transitions from the unlock-indicating state to the lock-indicating state, the controller 424 may send a first signal to the indicator 430, and the EPD 432 may display the locked indicia in response to the first signal. The EPD 432 will continue to display the locked indicia until a second signal is received from the controller 424. When the sensor 410 transitions from the lock-indicating state to the unlock-indicating state, the controller 424 may send the second signal to the indicator 430, and the EPD 432 may display the unlocked indicia in response to the second signal. The signals may comprise a series of electrical pulses, each sent to one of the electrodes of the indicator 430 such that the EPD 432 displays the appropriate indicia.

Because the indicator 430 requires power only when changing the indicia displayed on the EPD 432, the exemplary status-indicating assembly 400 requires little power. This enables the status-indicating assembly 400 to operate for a relatively long amount of time with a relatively small power source such as the battery 426. This reduces the frequency with which the battery 426 must be replaced or recharged, and eliminates the need for larger batteries which may be more expensive, or line power which complicates installation. In certain forms, a solar cell can be mounted on the assembly 100 or the door 102 to recharge the battery 426 or to charge a capacitor, which may serve increase battery life or eliminate the need for a battery.

In certain embodiments, the battery 426 may be selected as having a charge sufficient to operate the status-indicating assembly 400 for a predetermined number of cycles. The number of cycles may be selected based upon the number of times the locking assembly 100' is expected to transition between the locked and unlocked state over a predetermined time period, such as ten or fifteen years. In other forms, the battery 426 may be replaced by another form of energy storage device such as a capacitor or super-capacitor.

In certain forms, the electronic indicator 430 can be constructed as a modular indicator configured for installation in any of a plurality of locking assemblies. For example, the controller 424 and EPD 432 may be assembled into a module that can be installed on existing assemblies—such as cylindrical lock assemblies, mortise locking assemblies, exit devices, and/or tubular locks—which include a sensor and wire such as the microswitch 412 and the wire harness 422. Such a module may be easily accessible for maintenance or replacement in the field.

The inner escutcheon 440 is larger than the previously-described inner rose 136, in order to accommodate the various elements of the transmission 420 and the indicator 430. In certain forms, the inner escutcheon 440 may comprise a low profile. That is to say, the portion of the escutcheon 440 which houses the indicator 430 may not necessarily extend a greater distance from the door 102 than the traditional inner rose 136. Such low-profile forms of the escutcheon 440 enable the escutcheon 440 to be used with existing handles, while maintaining the clearances required by various codes and ordinances. The inner escutcheon 440 may further include a transparent or translucent window 444 positioned in the opening 442, in order to protect the EPD 432 from damage, tampering, and the insertion of foreign objects. The window 444 may be removably coupled to the inner escutcheon 440, such that the window 444 may be easily replaced in the field if it is damaged.

While the illustrative electronic status-indicating assembly 400 is configured to indicate only the locked or unlocked indicia in response to the status of the locking assembly 100', it is also contemplated that additional or alternative indicia may be displayed in response to additional or alternative criteria. For example, the status-indicating assembly 400 may include a voltage sensor operably coupled to the battery 426, and the controller 424 may be configured to cause the EPD 432 to display a low battery indicia when the voltage of the battery 426 falls below a threshold voltage. In other forms, the controller 424 may be configured to cause the EPD 432 to display one or more error indicia in response to improper installation or failure of a component of the status-indicating assembly 400, such as if the connector 423 is not properly connected to the controller 424.

Due to the novel construction of the status-indicating assembly 400, the assembly 400 can be installed to an existing locking assembly without requiring excessive modification of the door or the locking assembly. That is to say, status-indicating assembly 400 can be installed without enlarging the cross-bore 108, drilling additional holes in the door 102, or modifying the spring cages 118, 138. As a result, the illustrative status-indicating assembly 400 can be installed to a conventional locking assembly and a commercially available door at relatively low cost. For example, when retrofitting the illustrative cylindrical lock assembly 101 to create the exemplary modified cylindrical lock assembly 101', the retrofit may include replacing only the original mounting plate 128, inner rose 136, and chassis 200, with the modified mounting plate 128', inner escutcheon 440, and chassis 200'. In certain forms, the retrofit may include modifying the existing chassis 200 by replacing the original hub 232 with the modified hub 232'. The electronic status indicating assembly 400 may then be installed in the modified cylindrical lock assembly 101' to form the status-indicating locking assembly 100'. The more expensive elements of the cylindrical lock assembly 101—such as the latch bolt assembly 121, handles 112, 132, lock cylinders 114, 134, and spring cages 118, 138—may not necessarily be replaced.

With reference to FIGS. 8-11, a status-indicating locking assembly 100" includes a modified cylindrical lock assembly 101" and a mechanical status-indicating assembly 500 according to an embodiment of the invention. The locking assembly 100" is substantially similar to the previously-described locking assembly 100'; unless indicated otherwise, the same reference characters are used to indicate the same elements, and similar reference characters are used to indicate similar elements.

The mechanical status-indicating assembly 500 includes a mechanical sensor 510, a mechanical transmission 520 coupled to the sensor 510, and a mechanical indicator 530 coupled to the transmission 520. In the illustrated embodiment, the sensor 510 comprises a gear 512, the transmission 520 comprises a linkage 522, and the indicator 530 comprises an indicator plate 532. It is also contemplated that one or more elements of the status-indicating assembly 500 may be of another form, such as those described above with reference to the status indicating assembly 300.

In the present form, the locking assembly 100" includes an inner escutcheon 540 and a mounting plate 550, which are substantially similar to the previously-described inner escutcheon 440 and mounting plate 128'. The mounting plate 550 may include a plate portion 552 positioned on the door inner surface 106, and a recessed portion 554 extending into the cross-bore 108. The locking assembly 100" also includes a movable element, depicted herein as a key cam gear 502 which is rotationally coupled to a modified inner key cam stem 254". In the illustrated form, the key cam gear 502 is formed integrally with the stem 254", although it is also contemplated that these elements may be rotationally coupled in another manner. For example, when retrofitting the cylindrical lock assembly 101, the key cam gear 502 may be attached to the existing inner key cam stem 254 to create the modified inner key cam stem 254".

Figure 9:
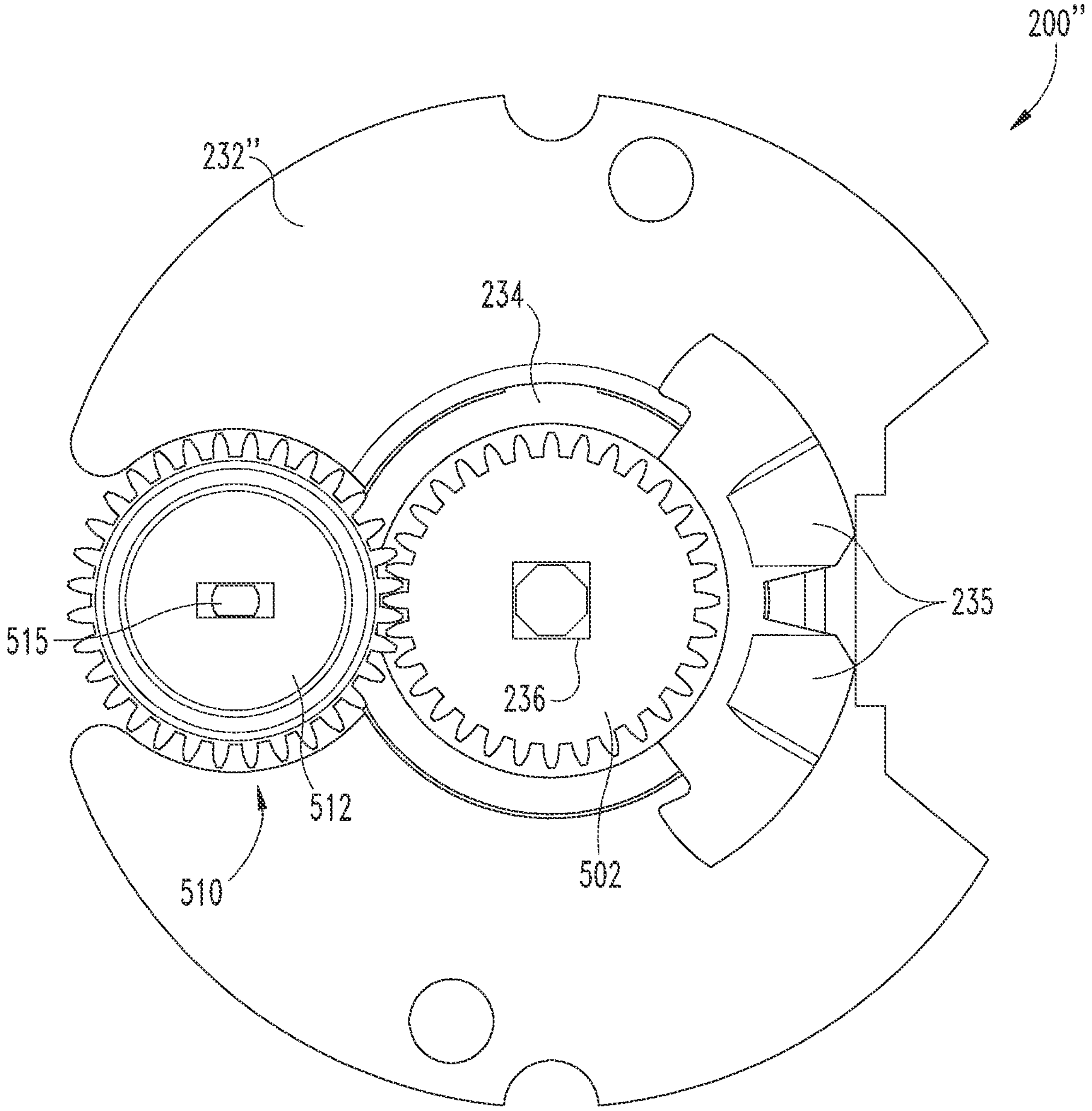
FIG. 9 is an elevational illustration of a chassis and a portion of the mechanical status-indicating assembly.

As best seen in FIG. 9, the sensor 510 is mounted on a modified chassis 200", and comprises a sensor gear 512 engaged with the key cam gear 502. The chassis 200" includes a modified hub 232" including cutouts or openings configured to accommodate the gears 502, 512, which are rotatably mounted thereon. For example, the sensor gear 512 may include a stem 513 which is snap-fit into one of the openings in the hub 232".

As a result of the meshing engagement of the gears 502, 512, the rotational position of the sensor 510 corresponds to that of the inner key cam stem 254". While the illustrated key cam gear 502 and sensor gear 512 are of substantially equal diameter, it is also contemplated that one of the gears 502, 512 may comprise a diameter larger than that of the other of the gears 502, 512, for example to provide a mechanical advantage. For example, if the diameter of the key cam gear 502 is greater than that of the sensor gear 512, rotation of the inner key cam stem 254" by a first angular displacement will cause a second, greater, angular displacement of the sensor 510.

Figure 10:
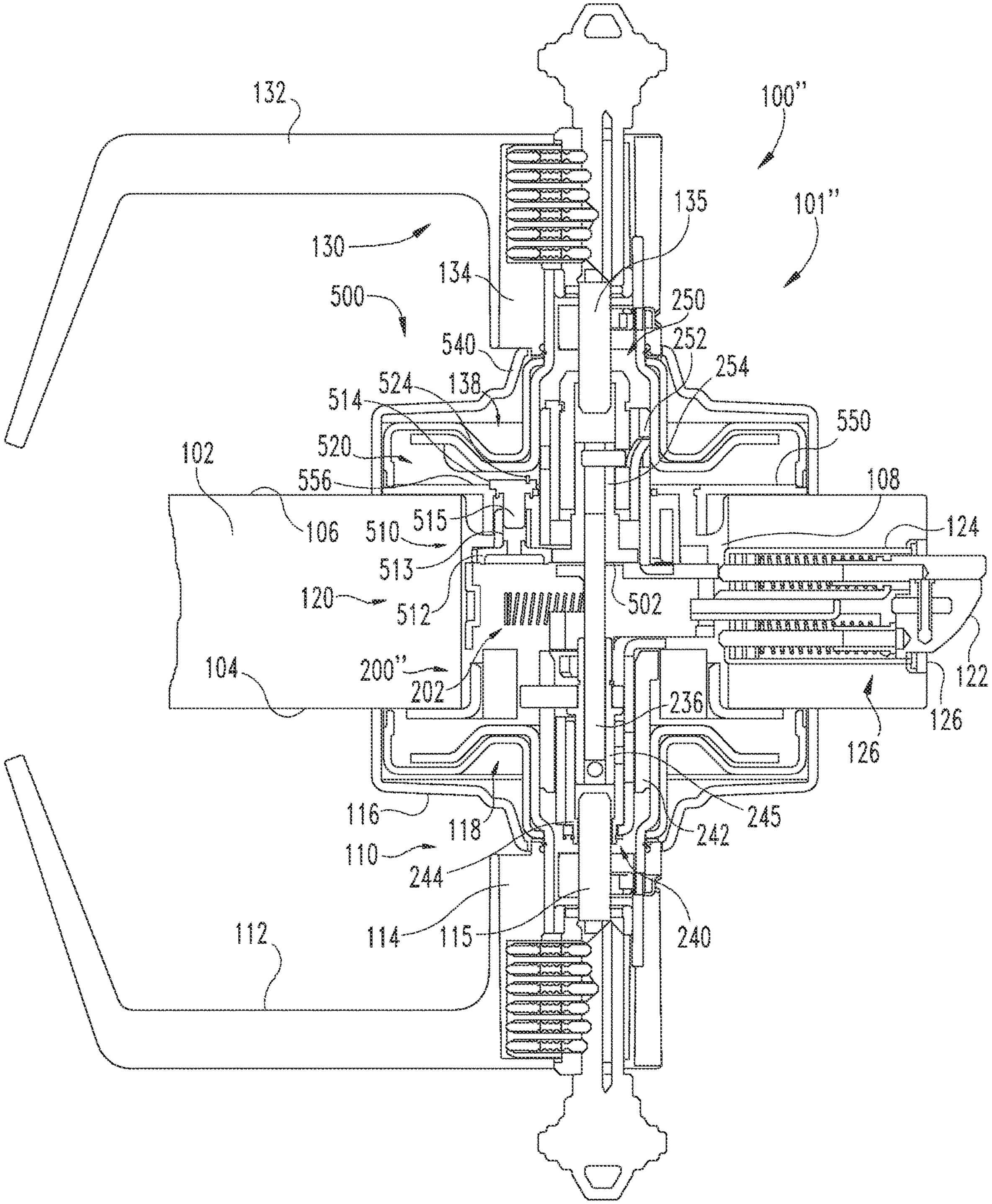
FIG. 10 depicts a horizontal cross-section of the locking assembly of FIG. 8.
Figure 11:
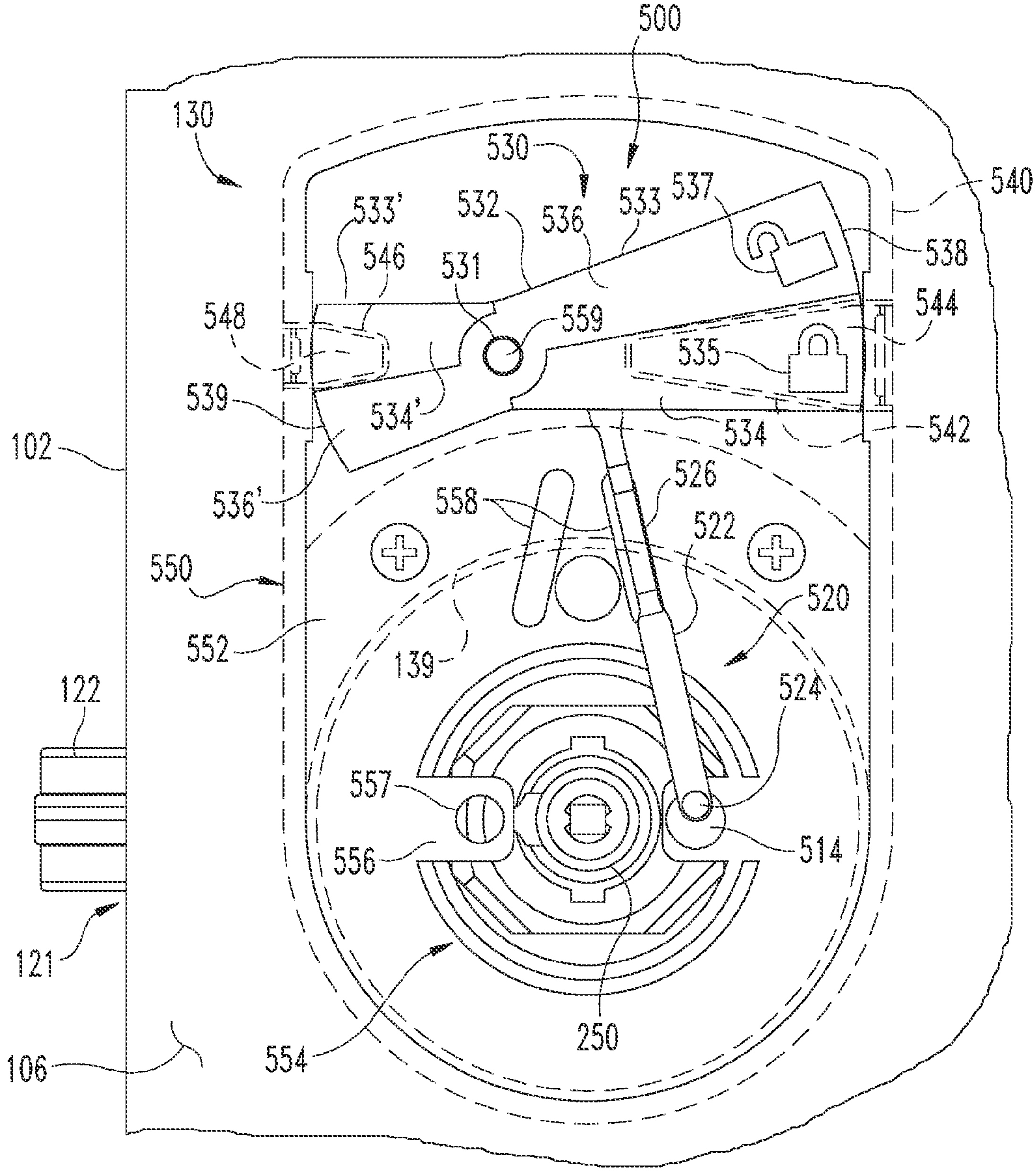
FIG. 11 is an elevational illustration of a portion of the locking assembly of FIG. 8.

As best seen in FIGS. 10 and 11, in the illustrated embodiment, the sensor 510 and latch bolt assembly 121 are positioned on opposite sides of the key cam gear 502, although it is also contemplated that the sensor 510 and the latch bolt assembly 121 may be positioned on the same side of the key cam gear 502. The sensor 510 also includes a follower 514 rotationally coupled to the sensor gear 512. For example, the follower 514 may include a stem 515 which extends into an opening in the sensor gear stem 513. The mounting plate 550 may include a tab 556 including an opening 557, and a portion of the follower 514 may be positioned in the opening 557, such that the tab 556 supports the follower 514. The rotational coupling between the sensor gear 512 and the follower 514 may also be a sliding coupling, such that the follower 514 is axially movable with respect to the sensor gear 512. Such a sliding coupling enables the sensor 510 to be installed on doors having varying thicknesses. For example, the illustrated door 102 is a relatively thin door; as a result, the follower stem 515 extends through substantially the entire length of the sensor gear stem 513. When the locking assembly 100" is installed on a door having a greater thickness, there may be a greater distance between the hub 232" and the tab 556. In such a case, the follower stem 515 may extend through only a portion of the sensor gear stem 513.

As best seen in FIG. 11, the transmission 520 comprises a linkage 522, which mechanically communicates the status of the locking assembly 100" from the sensor 510 to the indicator 530. While the illustrated linkage 522 is a single, unitary linkage, it is also contemplated that the linkage 522 may comprise a plurality of interconnected pieces. The linkage 522 is rotatably connected to the follower 514, for example via a rivet 524 extending through openings in the linkage 522 and the follower 514. The rivet 524 couples the linkage 522 to a location on the follower 514 which is radially removed from the rotational axis of the follower 514. As a result, when the sensor 510 is in the unlock-indicating state, the linkage 522 is in a corresponding unlock-indicating position. As the follower 514 rotates, the rivet 524 moves along an arcuate path, causing the linkage 522 to extend or retract. When the sensor 510 is rotated to the lock-indicating state (FIG. 11), the linkage 522 is in a corresponding lock-indicating position.

Figure 8:
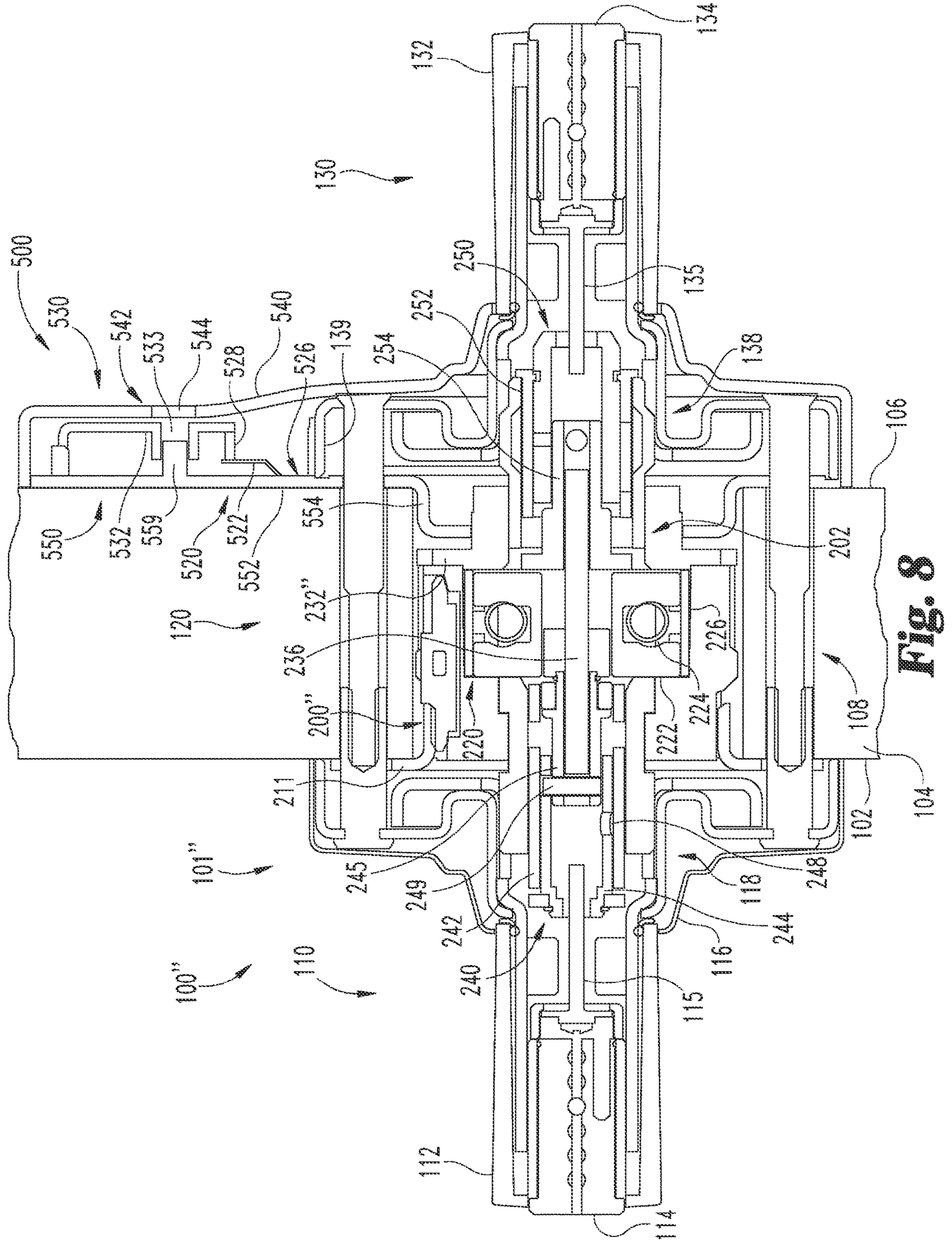
FIG. 8 is an illustration of a vertical cross-section of a locking assembly including a mechanical status-indicating assembly according to a form of the invention.

As best seen in FIGS. 8 and 10, the inner spring cage 138 includes a lip 139 which, when the locking assembly 100" is assembled, abuts the plate portion 552. In other words, when the locking assembly 100" is mounted on the door 102, the mounting plate 550 is sandwiched between the spring cage 138 and the door 102. Thus, the lip 139 is positioned between the sensor 510 and the indicator 530, obstructing the path along which the linkage 522 must extend to connect those elements.

In order to provide an unobstructed path between the sensor 510 and the indicator 530, the exemplary mounting plate 550 includes a channel 558 extending from a radially inward side of the spring cage 138 to a radially outward side of the spring cage 138, such that a portion of the channel is positioned between the spring cage 138 and the door 102. The linkage 522 includes an offset portion 526 positioned at least partially within the channel 558 between the lip 139 and the door 102. The channel 558 may have a length slightly greater than that of the offset portion 526, such that linkage 522 can move between the lock-indicating and unlock-indicating positions as the offset portion 526 travels along the channel 558. Thus, the channel 558 provides a path through which the transmission 520 can connect the sensor 510 to the indicator 530, despite the presence of the spring cage 138. In other embodiments, the spring cage 138 may be modified by cutting out a portion of the lip 139, in which case the linkage 522 may not necessarily include the offset portion 526.

The exemplary mechanical indicator 530 comprises an indicator plate 532, and is mounted on an interior side of the door 102, such that the indicator plate 532 is visible from inside the room when the door 102 is closed. In the illustrated embodiment, the indicator 530 is mounted on the mounting plate 550 behind the inner escutcheon 540. The escutcheon 540 includes an opening 542 through which a portion of the indicator plate 532 is visible, and may further include a transparent or translucent window 544 to protect the indicator plate 532 from damage and tampering.

The indicator plate 532 is movably mounted to the mounting plate 550, and is coupled to the linkage 522, for example by a fastener 528 such as a screw or bolt. As the linkage 522 moves between the lock-indicating and unlock-indicating positions, the indicator plate 532 moves between corresponding lock-indicating and unlock-indicating positions. In the illustrated embodiment, the indicator plate 532 is pivotally mounted to the mounting plate 550, such that the indicator plate 532 is pivotable between the lock-indicating and unlock-indicating positions. For example, the exemplary indicator plate 532 includes an opening 531 into which a pivot boss 559 extends, such that the indicator plate 532 is pivotable with respect to the mounting plate 550. It is also contemplated that the indicator plate 532 may be pivotally mounted to the mounting plate 550 in another manner. In other embodiments, the indicator plate 532 may be movable with respect to the mounting plate 550 in a manner other than pivoting. For example, the indicator plate 532 may be slidingly coupled to the mounting plate 550, such that the indicator plate 532 slides between the lock-indicating and unlock-indicating positions.

The indicator plate 532 includes a primary arm 533 comprising a primary lock-indicating section 534 including a locked indicia 535, and a primary unlock-indicating section 536 including an unlocked indicia 537. The min 533 is positioned behind the opening 542, such that a portion thereof is visible through the opening 542. When the indicator plate 532 is in the lock-indicating position, the locked indicia 535 is visible through the opening 542, and when the indicator plate 532 is in the unlock-indicating position, the unlocked indicia 537 is visible through the opening 542.

While the illustrated indicia 535, 537 comprise icons of locked and unlocked padlocks, respectively, it is also contemplated that additional or alternative indicia, such as those described above, may be utilized. For example, in the illustrated embodiment, the lock-indicating section 534 is primarily a first color, and the unlock-indicating section 536 is primarily a second color. The first color comprises a portion of the locked indicia 535, and the second color comprises a portion of the unlocked indicia 537. In certain forms, the indicator plate 532 may comprise a photoluminescent element to increase visibility of the indicia 535, 537 if the lights are turned out during a lock-down situation. In one form, the indicator plate 532 may be molded of a glow-in-the-dark plastic material, for example as a multi-shot plastic part using a photoluminescent thermoplastic material for one of the colors. In another form, the indicia 535, 537 may be applied using glow-in-the-dark paint or a glow-in-the dark pre-printed label.

The exemplary indicator plate 532 further includes a secondary arm 533' comprising a secondary lock-indicating section 534' and a secondary unlock-indicating section 536'. In the illustrated embodiment, each of the secondary sections 534', 536' is of the same color as the corresponding primary section 534, 536, although it is also contemplated that the secondary sections 534', 536' may include additional or alternative indicia. The escutcheon 540 includes a secondary opening 546 through which a portion of the secondary arm 533' is visible. The escutcheon 540 may further include a secondary window 548, and the windows 544, 548 may be a single unitary piece. When the indicator plate 532 is in the lock-indicating position, the secondary lock-indicating section 534' is visible through the secondary opening 546; when the indicator plate 532 is in the unlock-indicating position, the secondary unlock-indicating section 536' is visible through the secondary opening 546.

The primary arm 533 may further comprise a primary lip 538 extending toward the mounting plate 550. The sections 534, 536 may be positioned partially on the lip 538, such that the lip 538 includes indicia such as the first and second colors. The opening 542 and window 544 may wrap around the edge of the escutcheon 540, such that the lip 538 and the indicia thereon are visible from a greater viewing angle. Additionally or alternatively, the secondary arm 533' may comprise a secondary lip 539 extending toward the mounting plate 550. The secondary sections 534', 536' may be positioned partially on the lip 539, such that the lip 539 includes indicia such as the first and second colors. The secondary opening 546 and window 548 may wrap around a second edge of the escutcheon 540, such that the secondary lip 539 and the indicia thereon are visible from a greater viewing angle. In the illustrated embodiment, the status-indicating assembly 500 and inner escutcheon 540 includes each of these features, such that the indicia are visible across a 180° viewing angle.

If the status-indicating assembly 500 were to incorrectly display the locked indicia 535 when the locking assembly 100" is unlocked, a user may mistakenly believe that an intruder cannot enter the room, subjecting the user to potential danger. In order to preclude such an occurrence, the indicator 530 may be configured as a fail-safe indicator. For example, in the illustrated indicator plate 532, the primary unlock-indicating section 536 is positioned above the primary lock-indicating section 534, and the primary arm 533 comprises a greater mass than the secondary arm 533'. As a result, the center of mass of the indicator plate 532 is located on the primary arm 533. If the linkage 522, rivet 524, or fastener 528 were to break or become disengaged with the indicator plate 532 in the lock-indicating position, the indicator plate 532 will pivot to the unlock-indicating position due to the force of gravity. Thus, in the event of failure of one or more elements of the status-indicating assembly 500, the indicator 530 will display the unlocked indicia 537 instead of incorrectly displaying the locked indicia 535.

Due to the simple construction of the various components, the mechanical status-indicating assembly 500 may be manufactured at a relatively low cost. The components may be created using relatively low-cost manufacturing techniques such as, for example stamping, die casting, injection-molding, screw-machining, and/or cold-heading. Furthermore, the status-indicating assembly 500 may be relatively easy for the user to assemble and install. For example, the follower 514, transmission 520, and indicator 530 may be assembled in a factory setting to increase ease of installation for the consumer.

Due to the fact that the sensor 510 is coupled to the transmission 520 without extending beyond the radial footprint of the chassis 200", the sensor 510 and chassis 200" can be installed into the existing cross-bore 108. Furthermore, the channels 558 in the mounting plate 550 enable the transmission 520 to couple the sensor 510 and the indicator 530 without modifying the door 102 or the inner spring cage 138. Thus, the status-indicating assembly 500 can be installed without enlarging the cross-bore 108, drilling additional holes in the door 102, or modifying the spring cages 118, 138. That is to say, the status-indicating assembly 500 can be installed to an existing cylindrical lock assembly such as the illustrated cylindrical lock assembly 101 without requiring excessive modification of the door 102 or the cylindrical lock assembly 101.

As can be seen from the foregoing, the illustrative mechanical status-indicating assembly 500 can be installed to a conventional locking assembly and a commercially available door at relatively low cost. For example, when retrofitting the illustrated cylindrical lock assembly 101 to create the exemplary modified cylindrical lock assembly 101", the retrofit may include replacing only the original mounting plate 128, inner rose 136, and chassis 200 with the modified mounting plate 550, inner escutcheon 540, and chassis 200", respectively. In certain forms, the retrofit may include modifying the existing chassis 200 by replacing the original hub 232 with the modified hub 232". The retrofit may further include attaching the key cam gear 502 to the original inner key cam stem 254, or replacing the original inner key cam stem 254 with the modified inner key cam stem 254". The mechanical status indicating assembly 500 may then be installed in the modified cylindrical lock assembly 101" to form the status-indicating locking assembly 100". As with the retrofit described above with reference to the status-indicating locking assembly 100', the more expensive elements of the cylindrical lock assembly 101—such as the latch bolt assembly 121, handles 112, 132, lock cylinders 114, 134, and spring cages 118, 138—may not necessarily be replaced.

Additionally, the illustrated status-indicating locking assembly 100" is non-handed. That is to say, various features of the locking assembly 100" enable a single locking assembly 100" to be installed on any of a plurality of doors having different handing configurations. For example, the illustrated mounting plate 550 is substantially symmetrical, and includes two of the tabs 556 and channels 558. When the locking assembly 100" is installed such that the inner handle 132 is positioned on the left when viewed from the inner side of the door 102 (FIGS. 10 and 11), the follower 514 is supported by a first of the tabs 556, and the offset portion 526 is positioned in a first of the channels 558. When the locking assembly 100" is installed such that the inner handle 132 is positioned on the right when viewed from the inner side of the door 102 (not illustrated), the follower 514 may be supported by a second of the tabs 556, and the offset portion 526 may be positioned in a second of the channels 558. Thus, by providing the mounting plate 550 with two tabs 556 and channels 558, the locking assembly 100" can be installed in a plurality of handing configurations without requiring additional components.

As is evident from the foregoing, the illustrative status-indicating assemblies described herein can be easily installed to an existing cylindrical lock assembly and a commercially available door without requiring excessive modification of the locking assembly or the door. Furthermore, the status-indicating assemblies may be installed in locking assemblies which do not include deadbolts. Additionally, the status-indicating assemblies described hereinabove may be passive status-indicating assemblies which indicate the status of the locking assembly without requiring interaction on the part of a user. Thus, the user can readily determine the status of the locking assembly without approaching the door. In addition to increasing the ease with which the status of the locking assembly can be determined, this feature also increases the safety of the user during emergency situations.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A lock assembly, comprising:

a lock control assembly having a locking state and an unlocking state; and a status-indicating assembly configured to visually indicate a status of the lock assembly without being acted on by a user, the status-indicating assembly comprising:

a sensor associated with the lock control assembly, the sensor having a lock-indicating state when the lock control assembly is in the locking state and an unlock-indicating state when the lock control assembly is in the unlocking state;

an indicator mounted for pivotal movement about a pivot axis, the indicator comprising a first indicium that is offset from the pivot axis by a first offset distance; and a transmission connected between the sensor and the indicator, wherein the transmission is engaged with the indicator at an engagement point that is offset from the pivot axis by a second offset distance less than the first offset distance;

wherein the indicator is configured to display a first indicia when the sensor is in the lock-indicating state and to display a second indicia when the sensor is in the unlock-indicating state.

2. The lock assembly of claim 1, further comprising:

a bolt having an extended position and a retracted position; and a manual actuator operably connected with the bolt;

wherein the lock control assembly is configured to prevent the manual actuator from retracting the bolt when the lock control assembly is in the locking state; and wherein the lock control assembly is configured to permit the manual actuator to retract the bolt when the lock control assembly is in the unlocking state.

3. The lock assembly of claim 1, wherein the status-indicating assembly further comprises a transmission connected between the sensor and the indicator and configured to communicate the state of the sensor to the indicator.

4. The lock assembly of claim 3, further comprising a mounting assembly configured for mounting to a face of a door, the mounting assembly including a spring cage defining a boundary between an inner region and an outer region;

wherein the indicator is positioned in the outer region; and wherein the transmission extends between the inner region and the outer region through an opening in the mounting assembly.

5. The lock assembly of claim 1, wherein the indicator is configured to display the first indicia and/or the second indicia such that the first indicia and/or the second indicia is visible throughout a viewing angle of 180 degrees.

6. The lock assembly of claim 1, further comprising a lock operator operable to transition the lock control assembly between the locking state and the unlocking state.

7. The lock assembly of claim 1, wherein the lock control assembly comprises a movable component having a first position in the locking state and a second position in the unlocking state; and wherein the sensor is associated with the movable component such that movement of the movable component between the first position and the second position transitions the sensor between the lock-indicating state and the unlock-indicating state.

8. A lockset, comprising:

a lock control assembly having a first control state and a second control state, wherein one of the first and second control states is an unlocked state, and the other of the first and second control states is a locked state;

a lock operator operable to transition the lock control assembly between the first control state and the second control state; and a status-indicating assembly, comprising:

a sensor having a first sensor state in response to the first control state and a second sensor state in response to the second control state;

an indicator mounted for pivotal movement about a pivot axis, the indicator comprising a first indicium and a second indicium; and a transmission connected between the sensor and the indicator, wherein the transmission is engaged with the indicator at an engagement point;

wherein the indicator is configured to display the first indicium in response to the first sensor state;

wherein the indicator is configured to display the second indicium in response to the second sensor state; and wherein a first offset distance between the pivot axis and the first indicium is greater than a second offset distance between the pivot axis and the engagement point.

9. The lockset of claim 8, wherein the status-indicating assembly further comprises a transmission operably connected between the sensor and the indicator; and wherein the transmission is configured to cause the indicator to display the first indicia in response to the first sensor state, and to cause the indicator to display the second indicia in response to the second sensor state.

10. The lockset of claim 8, wherein the indicator is configured to display the first indicia and/or the second indicia such that the first indicia and/or the second indicia is visible throughout a viewing angle of 180 degrees.

11. The lockset of claim 8, further comprising:

a bolt having an extended position and a retracted position; and a manual actuator operably connected with the bolt;

wherein the lock control assembly is configured to prevent the manual actuator from retracting the bolt when the lock control assembly is in the locked state; and wherein the lock control assembly is configured to permit the manual actuator to retract the bolt when the lock control assembly is in the unlocked state.

12. The lockset of claim 8, further comprising:

a chassis;

a drive tube rotatably mounted to the chassis;

a slide slidably mounted in the chassis and engaged with the drive tube, wherein the slide is configured to move transversely in response to rotation of the drive tube; and an actuator connected with the drive tube via the lock control assembly;

wherein, the actuator is operable to rotate the drive tube when the lock control assembly is in the unlocked state; and wherein the actuator is inoperable to rotate the drive tube when the lock control assembly is in the locked state.

13. The lockset of claim 12, wherein the chassis is configured to be mounted in a standard circular cross-bore of a commercially-available door.

14. The lockset of claim 8, wherein the lock control assembly comprises a movable component having a first position in the first control state and a second position in the second control state; and wherein the sensor is associated with the movable component such that movement of the movable component between the first position and the second position transitions the sensor between the first sensor state and the second sensor state.

15. The lockset of claim 8, wherein the sensor comprises means for sensing the state of the lock control assembly; and wherein the indicator comprises means for selectively displaying the first and second indicia.

16. The lockset of claim 8, wherein the transmission is mounted for movement in a direction transverse to the pivot axis.

17. The lock assembly of claim 1, wherein the transmission is mounted for movement in a direction transverse to the pivot axis.

* * * * *